United States Patent
Moriyama

(10) Patent No.: US 11,835,141 B2
(45) Date of Patent: Dec. 5, 2023

(54) DUST COVER

(71) Applicant: NSK LTD., Tokyo (JP)

(72) Inventor: Seiichi Moriyama, Gunma (JP)

(73) Assignee: NSK LTD., Tokyo (JP)

( * ) Notice: Subject to any disclaimer, the term of this patent is extended or adjusted under 35 U.S.C. 154(b) by 181 days.

(21) Appl. No.: 17/596,915

(22) PCT Filed: Jun. 18, 2020

(86) PCT No.: PCT/JP2020/024038
§ 371 (c)(1),
(2) Date: Dec. 21, 2021

(87) PCT Pub. No.: WO2020/262203
PCT Pub. Date: Dec. 30, 2020

(65) Prior Publication Data
US 2022/0316599 A1    Oct. 6, 2022

(30) Foreign Application Priority Data

Jun. 25, 2019 (JP) ................................. 2019-117354

(51) Int. Cl.
*F16J 15/52* (2006.01)
*B62D 1/16* (2006.01)
*F16J 3/04* (2006.01)

(52) U.S. Cl.
CPC ................ *F16J 15/52* (2013.01); *B62D 1/16* (2013.01); *F16J 3/04* (2013.01)

(58) Field of Classification Search
CPC .................................... F16J 15/51; B62D 1/16
See application file for complete search history.

(56) References Cited

U.S. PATENT DOCUMENTS

2006/0108782 A1 * 5/2006 Kanazawa ............... F16J 15/50
280/779

FOREIGN PATENT DOCUMENTS

| DE | 10 2007 027 135 A1 | 12/2008 |
| DE | 10 2007 052 721 A1 | 5/2009 |
| JP | 2004-283976 A | 10/2004 |
| JP | 2018016149 A * | 2/2018 |
| JP | 2018016152 A * | 2/2018 |
| JP | 2018017278 A * | 2/2018 |
| JP | 2019-006268 A | 1/2019 |
| WO | 2004/025152 A1 | 3/2004 |

* cited by examiner

*Primary Examiner* — Vishal A Patel
(74) *Attorney, Agent, or Firm* — Sughrue Mion, PLLC

(57) ABSTRACT

To provide a dust cover capable of maintaining a state in which a first flexible part and a second flexible part of a bellows are fitted onto a mounting member. A dust cover includes a bushing, a bellows, and a mounting member. The mounting member has a main body and a flange part.

8 Claims, 19 Drawing Sheets

DUST COVER

CROSS REFERENCE TO RELATED APPLICATIONS

This application is a National Stage of International Application No. PCT/JP2020/024038 filed Jun. 18, 2020, claiming priority based on Japanese Patent Application No. 2019-117354 filed Jun. 25, 2019.

FIELD

The present disclosure relates to a dust cover disposed over a gap between a steering shaft and a dash panel.

BACKGROUND

A steering apparatus of vehicles includes a steering shaft. The steering shaft passes through a through part of a dash panel separating a vehicle cabin and an engine room from each other. The steering shaft moves along with adjustment of the position of the steering wheel, vibrations during traveling, or the like, and thus a certain gap is provided between the steering shaft and the through part of the dash panel. Meanwhile, it is required that entry of outside air containing foreign matters such as dust, sound generated in an engine room, and the like into the vehicle cabin be prevented. Given these circumstances, a dust cover is provided over the gap between the steering shaft and the through part of the dash panel (refer to Patent Literature 1, for example).

CITATION LIST

Patent Literature

Patent Literature 1: Japanese Patent Application Laid-open No. 2019-6268

SUMMARY

Technical Problem

The dust cover may be required to be transported to a work area in which the dust cover is mounted on the dash panel with a first flexible part and a second flexible part of a bellows fixed to a mounting member.

The present disclosure has been made in view of the above problem, and an object thereof is to provide a dust cover capable of maintaining a state in which a first flexible part and a second flexible part of a bellows are fitted onto a mounting member.

Solution to Problem

To achieve the above object, a dust cover according to an embodiment of the present disclosure comprising: a bushing mounted on an outer circumferential face of a steering shaft passing through a tubular member of a dash panel; an annular bellows covering a gap between the tubular member and the bushing; and a tubular mounting member pressing the bellows against the tubular member, the mounting member having: a main body extending along a circumferential direction about a central axis of the steering shaft; and a flange part protruding outward in a radial direction of the steering shaft, the bellows having: a bushing fitting part being in contact with an outer circumferential face of the bushing; a first outer rim part being in contact with an outer circumferential face of the main body; a first flexible part coupling the bushing fitting part and the first outer rim part to each other; a second outer rim part disposed on an outer circumferential side of the first outer rim part; a fixing member fixing the first outer rim part or the second outer rim part to the flange part; a second flexible part coupling the bushing fitting part and the second outer rim part to each other; a first convex part provided on one of an outer circumferential face of the first outer rim part and an inner circumferential face of the second outer rim part and protruding in a radial direction from the one toward another; and a first concave part provided on the other and fitted with the first convex part, and with the first outer rim part or the second outer rim part fixed to the flange part via the fixing member, the first convex part being fixed in an axial direction of the central axis by the first concave part.

With the fixing member fixed to the flange part, the first concave part fixes the first convex part in the axial direction, and thus a state in which the first flexible part and the second flexible part of the bellows are fitted onto the mounting member can be maintained. The first convex part is held between the first concave part and the flange part, whereby positioning of the first outer rim part and the second outer rim part in the axial direction can be performed more surely and easily. Furthermore, the first outer rim part, the second outer rim part, and the mounting member are integral with each other, thus water is inhibited from entering among the first outer rim part, the second outer rim part, and the mounting member, and thus waterproofness also improves.

As a desirable aspect of the dust cover, the fixing member is an elastic member, and the first outer rim part or the second outer rim part is elastically held on the flange part by the fixing member. With this aspect, even when outer force in a direction in which the bellows becomes detached from the mounting member is applied while the dust cover is transported to a work area in which the dust cover is mounted on the dash panel, the state in which the bellows is fixed to the mounting member is maintained.

As a desirable aspect of the dust cover, the flange part is provided with a through hole, and the fixing member is a falling prevention member passing through the through hole to be fixed to the flange part. With this aspect, a worker grips a tip part and causes the tip part to pass through the through hole, whereby the falling prevention member can be fixed to the flange part. Thus, the falling prevention member can be mounted on the flange part by easy work.

As a desirable aspect of the dust cover, the falling prevention member and the first outer rim part are an insert molded product molded integrally with the flange part. With this aspect, compared with a method in which the tip part of the falling prevention member is elongated and is caused to pass through the through hole, a thicker falling prevention member can be fixed to the flange part. In addition, insert molding does not impose an excessive load on the falling prevention member, and thus damage is unlikely to occur in the falling prevention member.

As a desirable aspect of the dust cover, a plurality of the falling prevention members are provided at regular intervals along the circumferential direction. With this aspect, holding force when the second outer rim part is held on the flange part is made uniform along the circumferential direction.

As a desirable aspect of the dust cover, the fixing member is a gripping member having a U shape in a section including the central axis and gripping the flange part from an outer circumferential side. With this aspect, gripping force with which the gripping member grips the flange part increases, and the state in which the bellows is fitted onto the mounting member can be maintained more surely.

As a desirable aspect of the dust cover, the gripping member extends annularly along the circumferential direction. With this aspect, work for mounting the gripping member on the mounting member can be performed more easily. In addition, gripping force with which the gripping member grips the flange part further increases.

As a desirable aspect of the dust cover, one of the outer circumferential face of the first outer rim part and the inner circumferential face of the second outer rim part is provided with a second convex part, whereas the other is provided with a second concave part fitted with the second convex part. With this aspect, the second convex part is fitted into the second concave part, and thus a radial face of the second convex part presses a radial face of the second concave part. Consequently, the holding force of the first flexible part and the second flexible part to the mounting member increases.

Advantageous Effects of Invention

The present disclosure can provide a dust cover capable of maintaining a state in which a first flexible part and a second flexible part of a bellows are fitted onto a mounting member.

DESCRIPTION OF EMBODIMENTS

The following describes the present invention in detail with reference to the accompanying drawings. The present invention is not limited by the following modes for performing the invention (hereinafter, referred to as embodiments). Components in the following embodiments include ones that those skilled in the art can easily think of, substantially the same ones, and so-called equivalents. Furthermore, the components disclosed in the following embodiments can be combined with each other as appropriate.

First Embodiment

Figure 1:
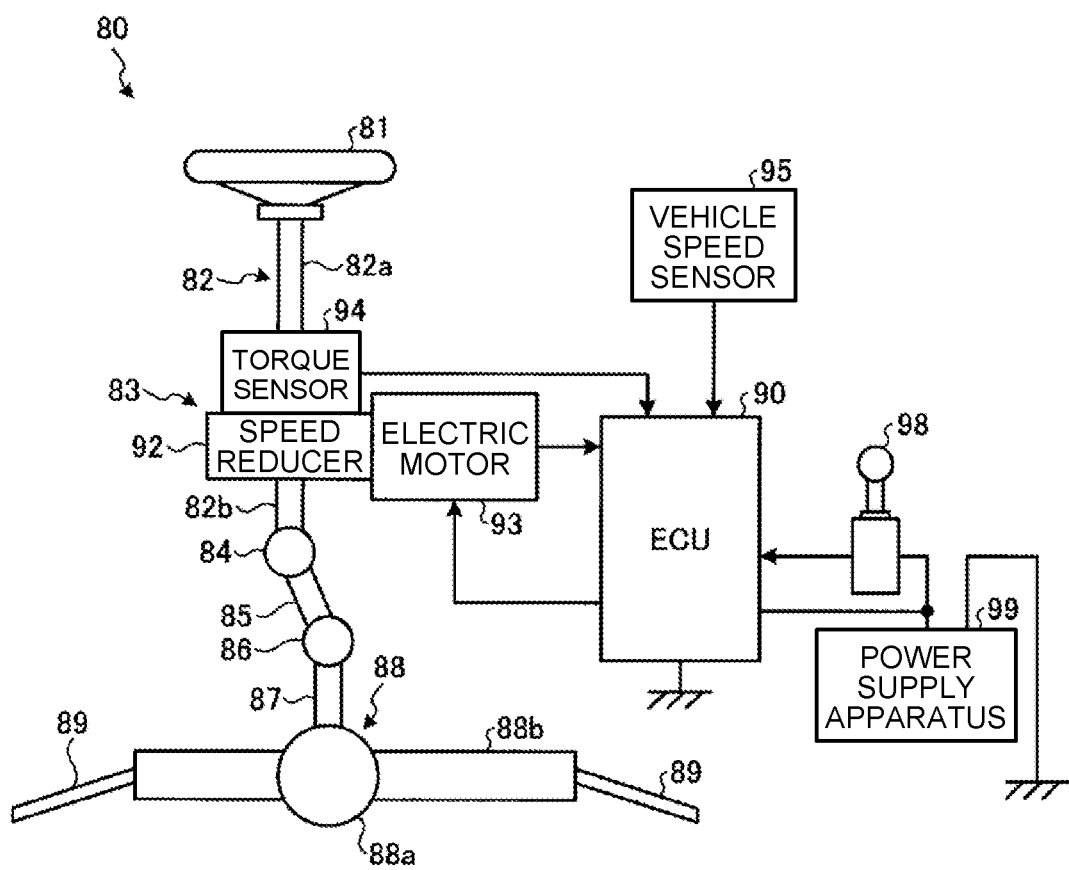
FIG. 1 is a schematic diagram of a steering apparatus of a first embodiment.
Figure 2:
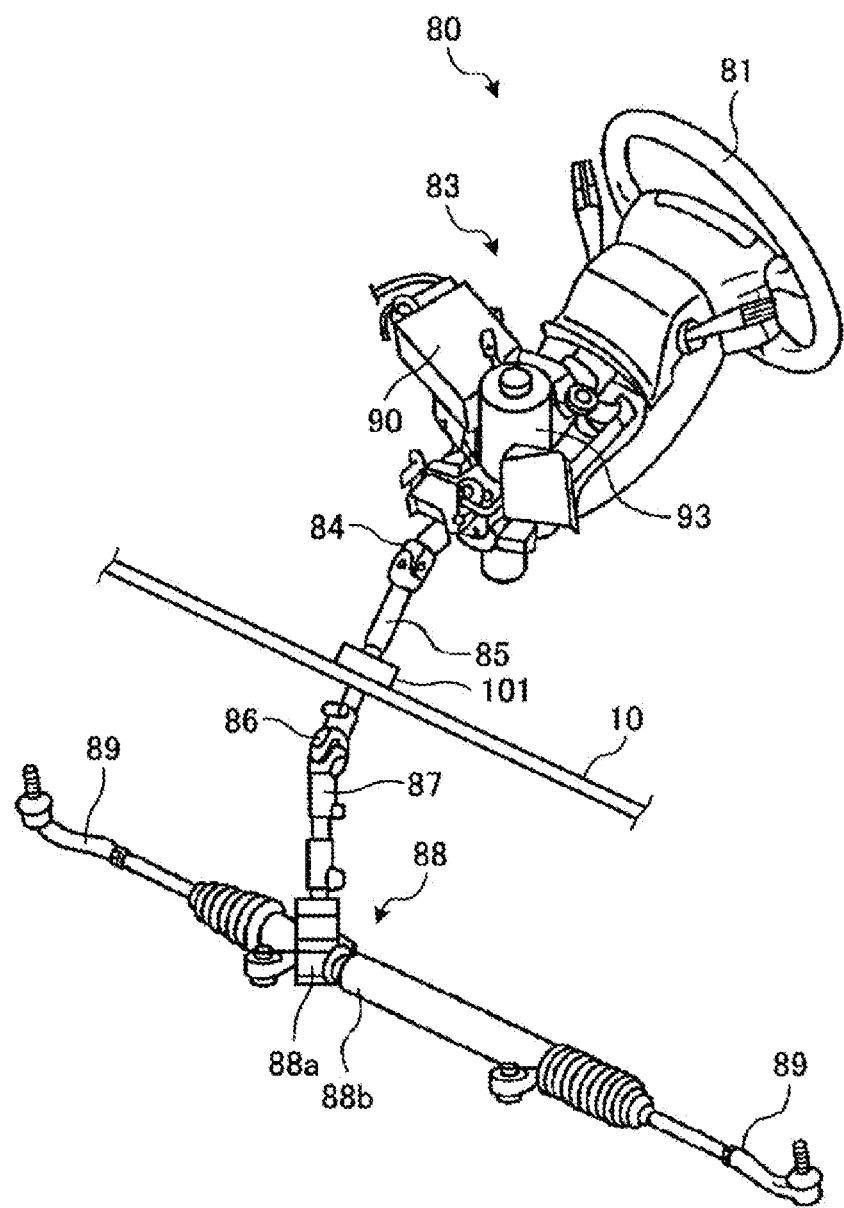
FIG. 2 is a perspective view of the steering apparatus of the first embodiment.

FIG. 1 is a schematic diagram of a steering apparatus of a first embodiment. FIG. 2 is a perspective view of the steering apparatus of the first embodiment. As illustrated in FIG. 1, a steering apparatus 80 includes a steering wheel 81, a first steering shaft 82, a steering power assist mechanism 83, a first universal joint 84, a second steering shaft 85, and a second universal joint 86 and is joined to a third steering shaft 87. In the following description, the front of a vehicle in which the steering apparatus 80 is installed is referred to simply as the front, whereas the rear of the vehicle is referred to simply as the rear.

As illustrated in FIG. 1, the first steering shaft 82 includes an input shaft 82a and an output shaft 82b. One end of the input shaft 82a is coupled to the steering wheel 81, whereas the other end of the input shaft 82a is coupled to the output shaft 82b. One end of the output shaft 82b is coupled to the input shaft 82a, whereas the other end of the output shaft 82b is coupled to the first universal joint 84.

As illustrated in FIG. 1, the second steering shaft 85 couples the first universal joint 84 and the second universal joint 86 to each other. One end of the second steering shaft 85 is coupled to the first universal joint 84, whereas the other end thereof is coupled to the second universal joint 86. One end of the third steering shaft 87 is coupled to the second universal joint 86, whereas the other end of the third steering shaft 87 is coupled to a steering gear 88. As illustrated in FIG. 2, the second steering shaft 85 passes through a dash panel 10. The dash panel 10 is a partition separating a vehicle cabin and an engine room from each other.

As illustrated in FIG. 1, the steering gear 88 includes a pinion 88a and a rack 88b. The pinion 88a is coupled to the third steering shaft 87. The rack 88b engages with the pinion 88a. The steering gear 88 converts rotational motion transmitted to the pinion 88a into linear motion by the rack 88b. The rack 88b is coupled to a tie rod 89. The rack 88b moves, whereby the angle of wheels changes.

As illustrated in FIG. 1, the steering power assist mechanism 83 includes a speed reducer 92 and an electric motor 93. The speed reducer 92 is a worm speed reducer, for example. Torque produced by the electric motor 93 is transmitted to a worm wheel via a worm inside the speed reducer 92 to rotate the worm wheel. The speed reducer 92 increases the torque produced by the electric motor 93 by the worm and the worm wheel. The speed reducer 92 gives auxiliary steering torque to the output shaft 82b. That is to say, the steering apparatus 80 is of a column assist system.

As illustrated in FIG. 1, the steering apparatus 80 includes an electronic control unit (ECU) 90, a torque sensor 94, and a vehicle speed sensor 95. The electric motor 93, the torque sensor 94, and the vehicle speed sensor 95 are electrically connected to the ECU 90. The torque sensor 94 outputs steering torque transmitted to the input shaft 82a to the ECU 90 through Controller Area Network (CAN) communication. The vehicle speed sensor 95 detects a traveling speed of a vehicle body in which the steering apparatus 80 is installed (a vehicle speed). The vehicle speed sensor 95 is included in the vehicle body and outputs the vehicle speed to the ECU 90 through CAN communication.

The ECU 90 controls the operation of the electric motor 93. The ECU 90 acquires a signal from each of the torque sensor 94 and the vehicle speed sensor 95. To the ECU 90, with an ignition switch 98 turned on, electric power is supplied from a power supply apparatus 99 (an on-vehicle battery, for example). The ECU 90 calculates an auxiliary steering command value based on the steering torque and the vehicle speed. The ECU 90 regulates an electric power value to be supplied to the electric motor 93 based on the auxiliary steering command value. The ECU 90 acquires information on induced voltage from the electric motor 93 or information output from a resolver or the like provided in the electric motor 93. The ECU 90 controls the electric motor 93 to reduce the force required for the operation of the steering wheel 81.

Figure 3:
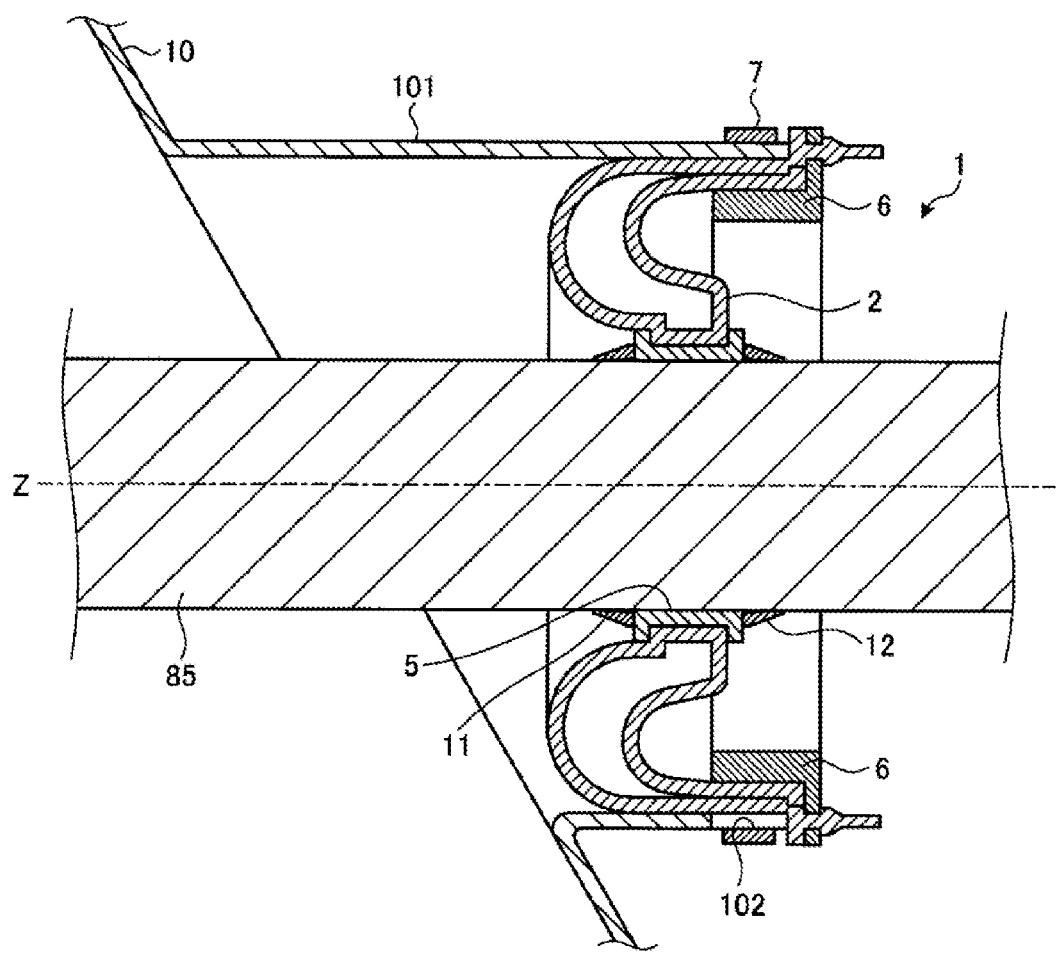
FIG. 3 is a sectional view of a dust cover mounted on a vehicle.
Figure 4:
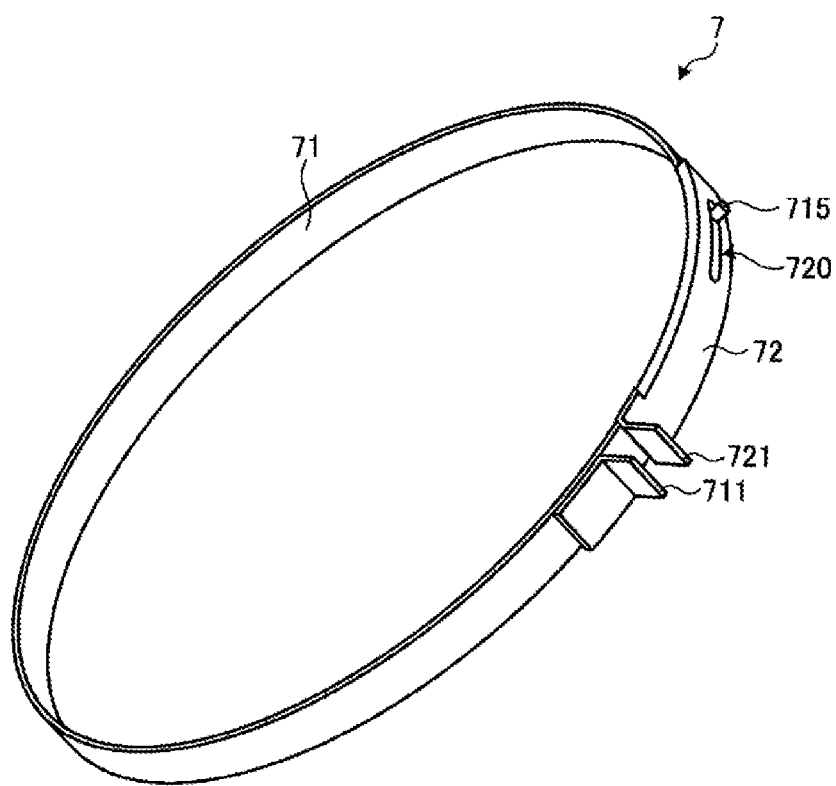
FIG. 4 is a perspective view of a band of the first embodiment.
Figure 5:
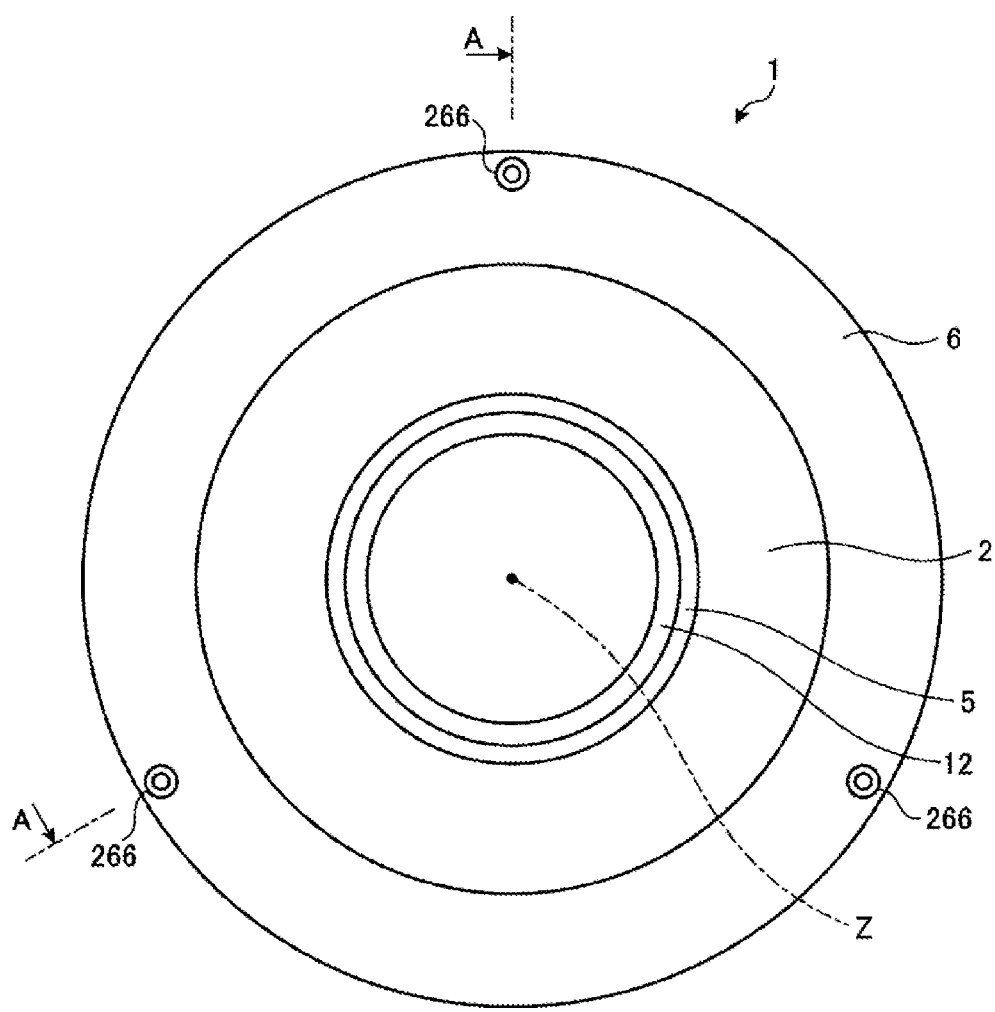
FIG. 5 is a front view of the dust cover of the first embodiment.
Figure 6:
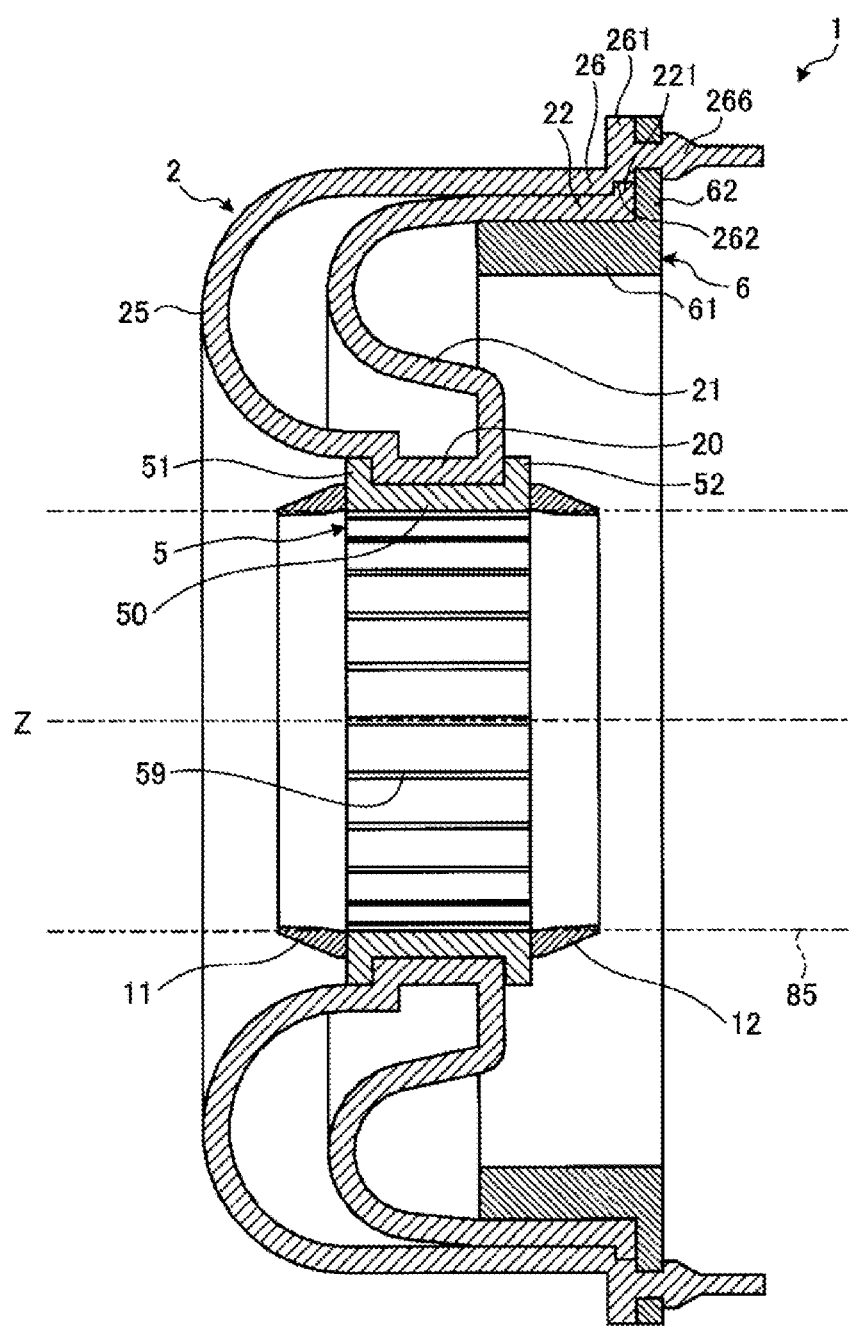
FIG. 6 is an A-A sectional view in FIG. 5.
Figure 7:
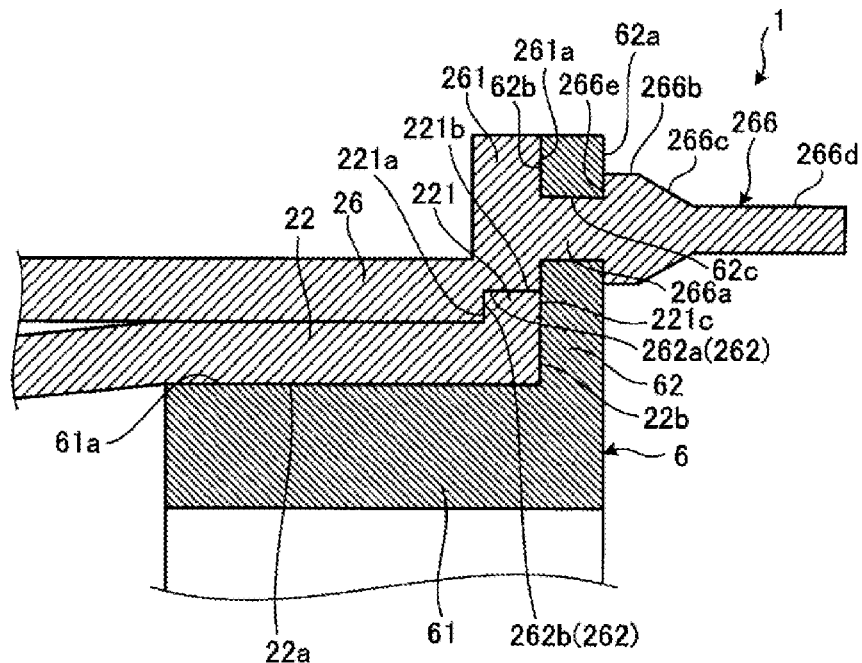
FIG. 7 is an enlarged view of the area around a mounting member in FIG. 6.
Figure 8:
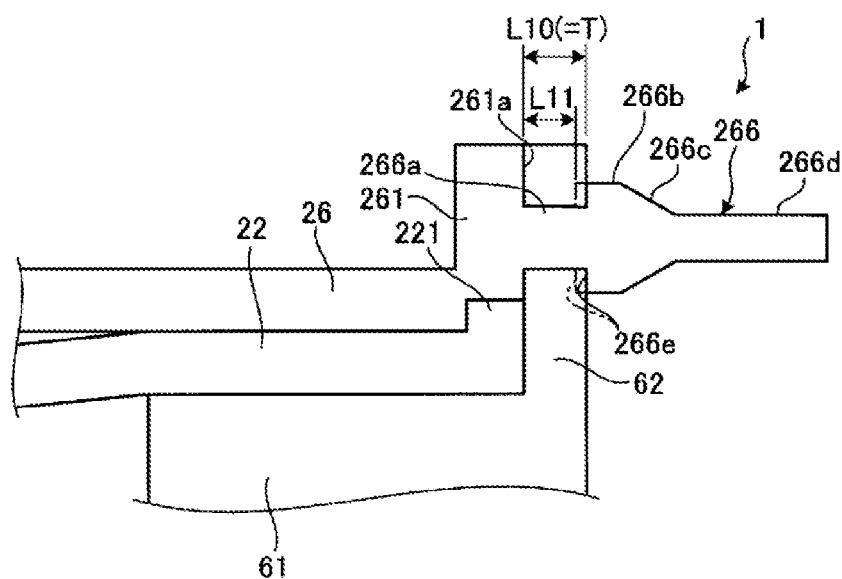
FIG. 8 is a schematic diagram illustrating the length of a falling prevention member.
Figure 9:
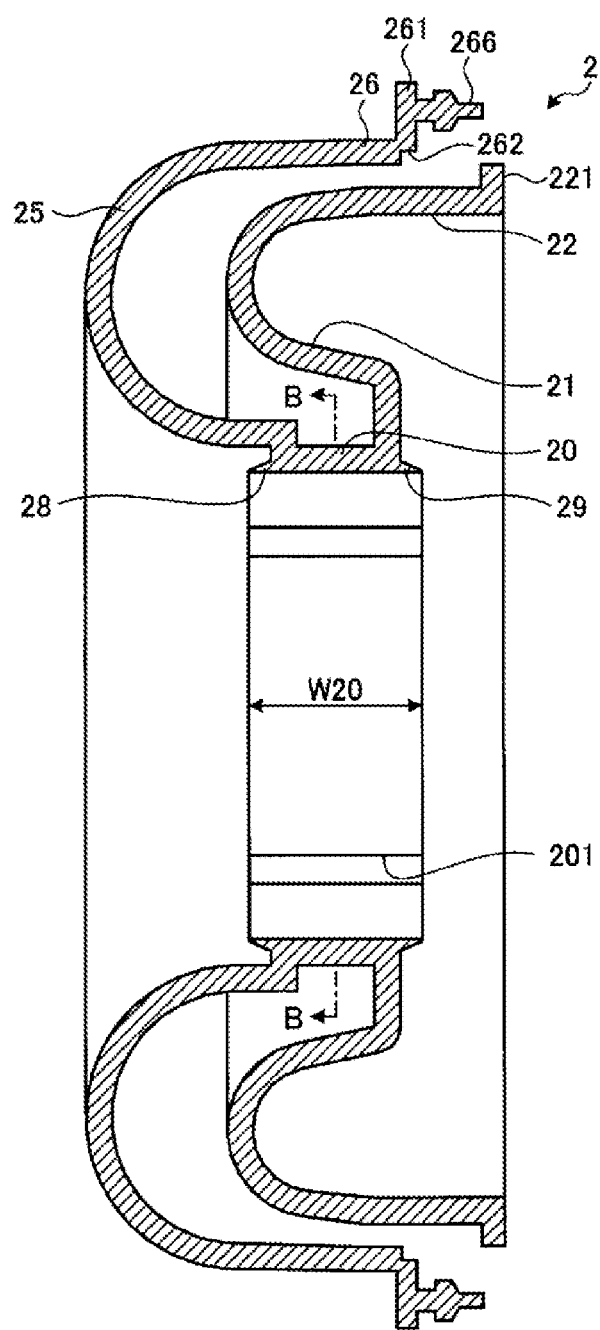
FIG. 9 is a sectional view of a bellows before being mounted on a bushing.
Figure 10:
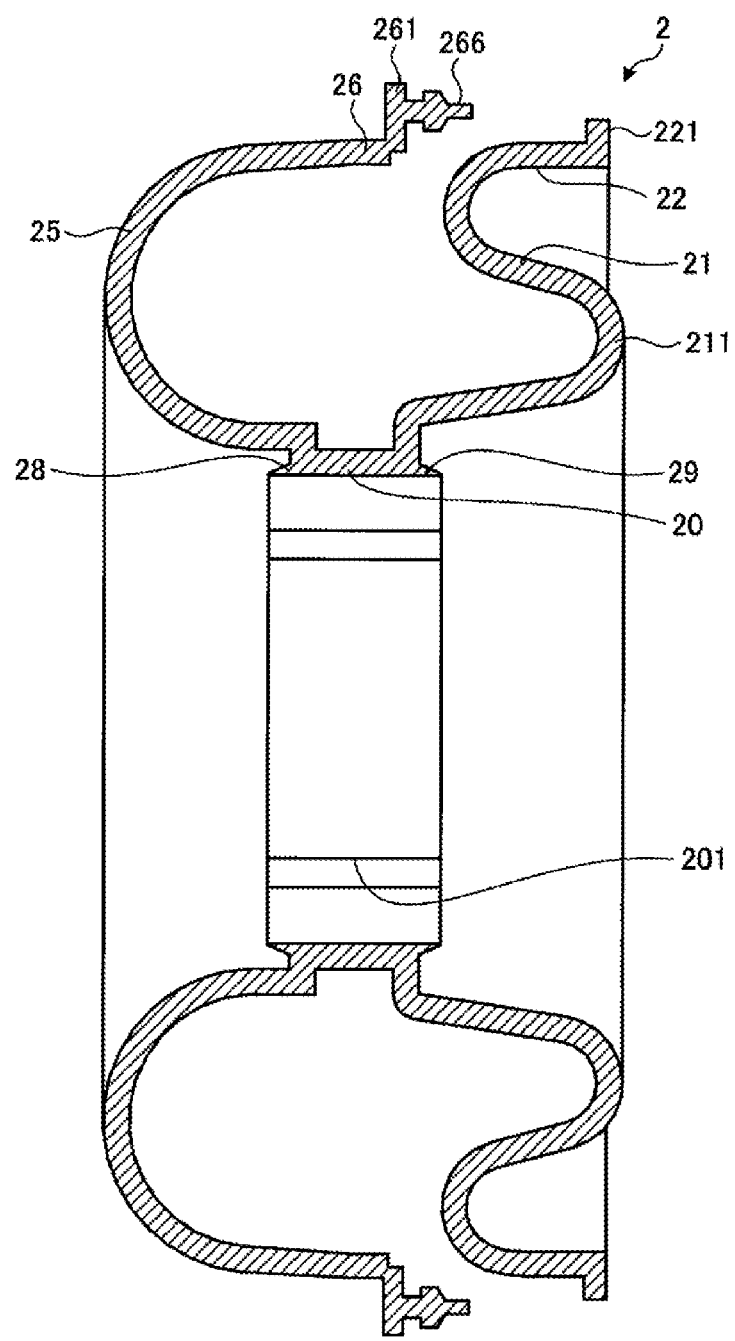
FIG. 10 is a sectional view of the bellows immediately after being taken out of a mold.
Figure 11:
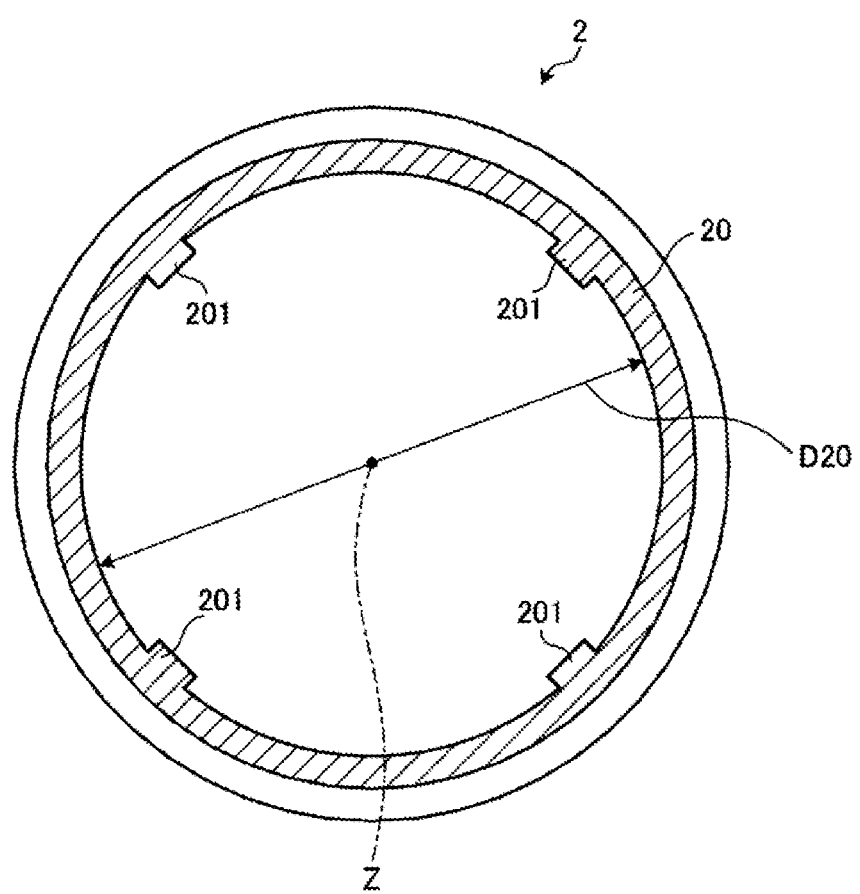
FIG. 11 is a B-B sectional view in FIG. 9.
Figure 12:
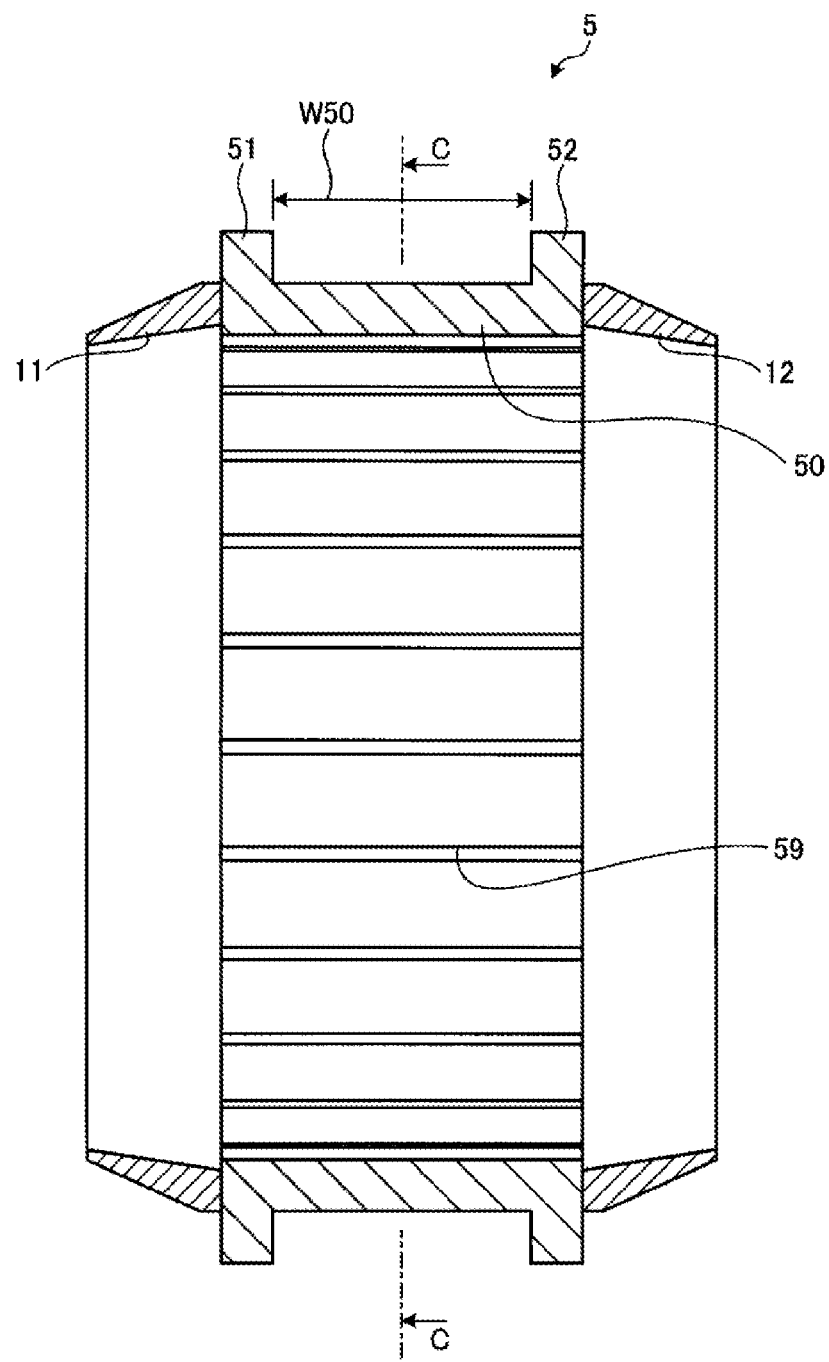
FIG. 12 is a sectional view of a bushing of the first embodiment.
Figure 13:
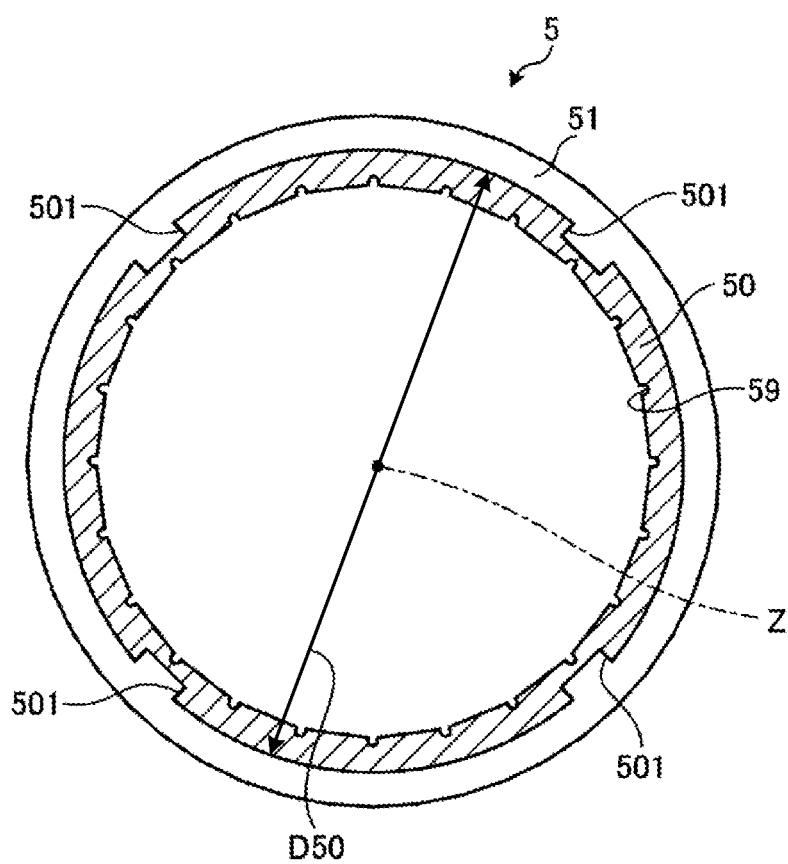
FIG. 13 is a C-C sectional view in FIG. 12.

FIG. 3 is a sectional view of a dust cover mounted on a vehicle. FIG. 4 is a perspective view of a band of the first embodiment. FIG. 5 is a front view of a dust cover of the first embodiment. FIG. 6 is an A-A sectional view in FIG. 5. FIG. 7 is an enlarged view of the area around a mounting member in FIG. 6. FIG. 8 is a schematic diagram illustrating the length of a falling prevention member. FIG. 9 is a sectional view of a bellows before being mounted on a bushing. FIG. 10 is a sectional view of the bellows immediately after being taken out of a mold. FIG. 11 is a B-B sectional view in FIG. 9. FIG. 12 is a sectional view of a bushing of the first embodiment. FIG. 13 is a C-C sectional view in FIG. 12.

In the following description, the direction along a central axis Z of the second steering shaft 85 is referred to as an axial direction, the direction orthogonal to the axial direction is referred to as a radial direction, and the direction along a circle with the central axis Z as the center is referred to as a circumferential direction. In FIG. 3, the right side is a vehicle cabin side, whereas the left side is an engine room side.

As illustrated in FIG. 3, the dash panel 10 includes a tubular member 101. An inner circumferential face of the tubular member 101 faces an outer circumferential face of the second steering shaft 85. The second steering shaft 85 may move along with adjustment of the position of the steering wheel 81, vibrations during traveling, or the like. Given this, an annular gap is provided between the inner circumferential face of the tubular member 101 and the outer circumferential face of the second steering shaft 85. To cover this gap, the steering apparatus 80 is provided with a dust cover 1.

The dust cover 1 is fitted to the inner circumferential face of the tubular member 101. The dust cover 1 is fixed to the tubular member 101 by a band 7 mounted on an outer circumferential face of the tubular member 101. The tubular member 101 becomes deformed by being clamped by the band 7. The tubular member 101 is made of metal, for example. When the tubular member 101 is metal, the tubular member 101 preferably has a slit 102 along the axial direction as illustrated in FIG. 3. The tubular member 101 has the slit 102, whereby the tubular member 101 easily becomes deformed when being clamped by the band 7.

As illustrated in FIG. 4, the band 7 includes an inner member 71 and an outer member 72. The inner member 71 and the outer member 72 are made of metal, for example. The outer member 72 overlaps with an outer circumferential face of the inner member 71. The inner member 71 includes a hook 715 protruding from the outer circumferential face and a gripping part 711. The outer member 72 includes an elongated hole 720 and a gripping part 721. The hook 715 is positioned inside the elongated hole 720. When force in a direction in which the gripping part 711 and the gripping part 721 become close to each other is applied, the inner diameter of the inner member 71 becomes smaller. When the inner diameter of the inner member 71 becomes a certain size, the hook 715 comes into contact with an end of the elongated hole 720. Thus, the inner diameter of the inner member 71 does not become the certain size or less. When the inner diameter of the inner member 71 becomes the certain size, a stopper protrudes from an inner wall of the elongated hole 720, for example, whereby the hook 715 is positioned. Thus, the inner member 71 and the outer member 72 do not relatively move, and thus the state in which the band 7 clamps the tubular member 101 is maintained.

As illustrated in FIG. 6, the dust cover 1 includes a mounting member 6, a bellows 2, a bushing 5, a seal lip 11, and a seal lip 12. The mounting member 6, the bellows 2, the bushing 5, the seal lip 11, and the seal lip 12 are each formed in an annular shape.

The mounting member 6 is a member pressing the bellows 2 against the tubular member 101 illustrated in FIG. 3. The mounting member 6 is made of an aluminum alloy, for example. The mounting member 6 may be made of synthetic resin. As illustrated in FIG. 7, the mounting member 6 includes a main body 61 and a flange part 62. The main body 61 has a cylindrical shape extending along the circumferential direction of the central axis Z of the second steering shaft 85. The main body 61 has an outer circumferential face 61a. The outer circumferential face 61a is a cylindrical face with the central axis Z as the center. The flange part 62 protrudes from the main body 61 outward in the radial direction. The flange part 62 has a vertical wall face 62a on the right side of FIG. 7 (the vehicle cabin side) and has a vertical wall face 62b on the left side of FIG. 7 (the engine room side). In a section including the central axis Z, the vertical wall face 62a and the vertical wall face 62b extend in parallel with each other. The vertical wall face 62a and the vertical wall face 62b are orthogonal to the outer circumferential face 61a. The flange part 62 is provided with a through hole 62c passing through in the axial direction.

The bellows 2 is made of rubber, for example. The bellows 2 is an annular member covering a gap between the tubular member 101 and the bushing 5. As illustrated in FIG. 6, the bellows 2 includes a bushing fitting part 20, a first outer rim part 22, a first flexible part 21, a second outer rim part 26, and a second flexible part 25.

The bushing fitting part 20 is positioned at an end of the bellows 2 on the inside in the radial direction. The bushing fitting part 20 is fitted to the bushing 5. That is to say, the bushing fitting part 20 is in contact with an outer circumferential face of the bushing 5. As illustrated in FIG. 10, the bushing fitting part 20 includes a third protrusion 28, a third protrusion 29, and convex parts 201. The third protrusion 28 protrudes from the bushing fitting part 20 toward the engine room side. The third protrusion 29 protrudes from the bushing fitting part 20 toward the vehicle cabin side. With the bushing fitting part 20 fitted to the bushing 5, the third protrusion 28 and the third protrusion 29 are pushed by the bushing 5 to become deformed. The convex parts 201 are provided on an inner circumferential face of the bushing fitting part 20. Four convex parts 201 are arranged at regular intervals in the circumferential direction, for example.

As illustrated in FIG. 7, an inner circumferential face 22a of the first outer rim part 22 of the bellows 2 is in contact with the outer circumferential face 61a of the main body 61 of the mounting member 6. The first flexible part 21 couples the bushing fitting part 20 and the first outer rim part 22 to each other. In a section including the central axis Z, the first flexible part 21 is substantially U-shaped. The first outer rim part 22 is disposed at an end of the first flexible part 21. A tip face 22b of the first outer rim part 22 is in contact with the vertical wall face 62b of the flange part 62. A first convex part 221 protrudes from the first outer rim part 22 outward in the radial direction. The first convex part 221 has a radial face 221a, an outer circumferential face 221b, and a radial face 221c.

Thus, the first convex part 221 has a rectangular shape in a section including the central axis Z. The first convex part 221 and the first outer rim part 22 have an L shape in a section including the central axis Z. The radial face 221c is in contact with the vertical wall face 62b of the flange part 62. The radial face 221c and the tip face 22b are flush with each other. Thus, the first outer rim part 22 is positioned in the axial direction along the central axis Z.

The second outer rim part 26 is provided on an outer circumferential side of the first outer rim part 22. The second flexible part 25 couples the bushing fitting part 20 and the second outer rim part 26 to each other. In a section including the central axis Z, the second flexible part 25 is substantially U-shaped. The second outer rim part 26 is disposed at an end of the second flexible part 25. The second outer rim part 26 has a vertical wall part 261 protruding outward in the radial direction. The vertical wall part 261 has a vertical wall face 261a on the right side of FIG. 7 (the vehicle cabin side).

A first concave part 262 is provided inside the vertical wall part 261 in the radial direction. The first concave part 262 has an inner circumferential face 262a extending along the axial direction of the central axis Z and a radial face 262b extending along the radial direction in a section including the central axis Z. The inner circumferential face 262a is in contact with the outer circumferential face 221b of the first convex part 221. The radial face 262b is in contact with the radial face 221a of the first convex part 221. The first concave part 262 is fitted with the first convex part 221.

A falling prevention member 266 is provided integrally with the vertical wall part 261. The falling prevention member 266 is a fixing member fixing the second outer rim part 26 to the flange part 62. The falling prevention member 266 is rubber (an elastic member). The falling prevention member 266 has a small diameter part 266a, a large diameter part 266b, a tapered part 266c, and a tip part 266d.

The small diameter part 266a is disposed in the through hole 62c of the flange part 62. An outer circumferential face of the small diameter part 266a is in contact with an inner circumferential face of the through hole 62c. The large diameter part 266b and the tip part 266d have a cylindrical shape. The large diameter part 266b has a larger diameter than that of the tip part 266d. Consequently, an outer circumferential face of the tapered part 266c has a truncated cone shape having a gradually decreasing diameter toward the right side of FIG. 7 (the vehicle cabin side). The large diameter part 266b has a larger diameter than that of the small diameter part 266a. Consequently, a vertical wall face 266e of the large diameter part 266b is in contact with the vertical wall face 62a of the flange part 62.

The following describes the length of the small diameter part 266a of the falling prevention member 266 in the axial direction (a right-and-left direction in FIG. 8) with reference to FIG. 8. In a state before the falling prevention member 266 is mounted on the flange part 62, the length of the small diameter part 266a in the axial direction (the right-and-left direction in FIG. 8) is L11 as indicated by the chain double-dashed line in FIG. 8.

In a state after the falling prevention member 266 is mounted on the flange part 62, the length of the small diameter part 266a in the axial direction (the right-and-left direction in FIG. 8) is L10 as indicated by the solid line in FIG. 8. The length L10 is the same as a thickness T of the flange part 62. Thus, in the state after the falling prevention member 266 is mounted on the flange part 62, the falling prevention member 266 is elongated in the axial direction owing to elastic deformation. The falling prevention member 266 presses the flange part 62 against the vertical wall part 261 through elastic force. Consequently, the second outer rim part 26 is elastically held on the flange part 62 by the falling prevention member 266. As illustrated in FIG. 7, the first convex part 221 is held between the first concave part 262 and the flange part 62 in the axial direction. In other words, the first convex part 221 is fixed in the axial direction by the first concave part 262. As illustrated in FIG. 5, three falling prevention members 266 are provided at regular intervals along the circumferential direction of the mounting member 6.

The bellows 2 as rubber is molded using a mold, for example. As illustrated in FIG. 9, the shape of the first flexible part 21 of the bellows 2 taken out of the mold is different from the shape of the first flexible part 21 of the bellows 2 after being mounted on the bushing 5. To easily remove the bellows 2 from the mold, the first flexible part 21 has a bent part 211 as illustrated in FIG. 10. The bent part 211 is convex toward the side opposite to the second flexible part 25.

Thus, the first flexible part 21 is substantially S-shaped in a section including the central axis Z. The bent part 211 is reversed by the time when the bellows 2 is mounted on the bushing 5. That is to say, the bent part 211 is pushed toward the second flexible part 25.

The bushing 5 is a bearing rotatably supporting the second steering shaft 85. The bushing 5 is made of nylon, for example. As illustrated in FIG. 12, the bushing 5 includes a base part 50, an outer flange 51, an inner flange 52, and a plurality of lubricant grooves 59.

The base part 50 is in contact with the second steering shaft 85. The base part 50 includes concave parts 501 on its outer circumferential face. The number of concave parts 501 is four, for example. The four concave parts 501 are disposed at regular intervals in the circumferential direction. The convex parts 201 illustrated in FIG. 11 are fitted into the concave parts 501. Thus, the bushing fitting part 20 does not rotate with respect to the base part 50. Thus, relative rotation of the bellows 2 and the bushing 5 is restricted.

The outer flange 51 protrudes from an end of the base part 50 on the engine room side outward in the radial direction. The inner flange 52 protrudes from an end of the base part 50 on the vehicle cabin side outward in the radial direction. The bushing fitting part 20 of the bellows 2 is fitted into the space formed by the base part 50, the outer flange 51, and the inner flange 52. The lubricant grooves 59 are grooves provided on an inner circumferential face of the base part 50 and are along the axial direction, for example. The lubricant grooves 59 are across the full length of the bushing 5 in the axial direction. The lubricant grooves 59 are disposed at regular intervals in the circumferential direction, for example. The lubricant grooves 59 are filled with grease as a lubricant. Thus, friction between the bushing 5 and the second steering shaft 85 is reduced.

As illustrated in FIG. 12, a distance W50 from the outer flange 51 to the inner flange 52 in the axial direction is smaller than a width W20 illustrated in FIG. 9. The width W20 is the full length of the bushing fitting part 20 including the third protrusion 28 and the third protrusion 29 in the axial direction. When the bushing fitting part 20 is disposed between the outer flange 51 and the inner flange 52, the third protrusion 28 and the third protrusion 29 are compressed by the outer flange 51 and the inner flange 52, respectively. That is to say, the third protrusion 28 and the third protrusion 29 become deformed in the axial direction.

The third protrusion 28 and the third protrusion 29 come into intimate contact with the bushing 5, and thus a gap between the bushing fitting part 20 and the bushing 5 is sealed. Furthermore, when a load in the axial direction is applied to the bushing fitting part 20 by vibrations or the like, the third protrusion 28 or the third protrusion 29 that has become deformed is restored. Thus, the state in which the third protrusion 28 or the third protrusion 29 is in contact with the bushing 5 is maintained. Even when the load is applied to the bushing fitting part 20, the sealing property of the gap between the bushing fitting part 20 and the bushing 5 is maintained.

An inner diameter D20 of the bushing fitting part 20 illustrated in FIG. 11 is smaller than an outer diameter D50 of the base part 50 illustrated in FIG. 13. When the bushing fitting part 20 is mounted on the base part 50, the bushing fitting part 20 becomes deformed in the radial direction. Thus, the bushing fitting part 20 comes into intimate contact with the bushing 5. Thus, the gap between the bushing fitting part 20 and the bushing 5 is sealed.

The seal lip 11 is a sealing member separating a gap between the second steering shaft 85 and the bushing 5 and the engine room from each other. The seal lip 11 is nitrile rubber (NBR), for example, and is integral with the bushing 5 through vulcanization adhesion. As illustrated in FIG. 12, the seal lip 11 protrudes from an end face of the bushing 5 toward the engine room side. A minimum inner diameter of the seal lip 11 before coming into contact with the second steering shaft 85 is smaller than an outer diameter of the second steering shaft 85.

Thus, when the seal lip 11 comes into contact with the second steering shaft 85, the seal lip 11 becomes deformed. Owing to the elasticity of the seal lip 11, a gap between the seal lip 11 and the second steering shaft 85 is unlikely to occur. Thus, the seal lip 11 can prevent entry of foreign matters from the engine room to the inside of the bushing 5 and can also prevent leakage of the grease from the inside of the bushing 5 to the engine room. In addition, the seal lip 11 can reduce leakage of sound generated in the engine room to the vehicle cabin.

The seal lip 12 is a sealing member separating the gap between the second steering shaft 85 and the bushing 5 and the vehicle cabin from each other. The seal lip 12 is nitrile rubber (NBR), for example, and is integral with the bushing 5 through vulcanization adhesion. As illustrated in FIG. 12, the seal lip 12 protrudes from an end face of the bushing 5 toward the vehicle cabin side. A minimum inner diameter of the seal lip 12 before coming into contact with the second steering shaft 85 is smaller than the outer diameter of the second steering shaft 85. Thus, when the seal lip 12 comes into contact with the second steering shaft 85, the seal lip 12 becomes deformed. Owing to the elasticity of the seal lip 12, a gap between the seal lip 12 and the second steering shaft 85 is unlikely to occur. Thus, the seal lip 12 can prevent leakage of the grease from the inside of the bushing 5 to the vehicle cabin. In addition, the seal lip 12 can reduce leakage of sound generated in the engine room to the vehicle cabin.

As illustrated in FIG. 3, the tubular member 101 is clamped by the band 7, and thus the part of the bellows 2 between the tubular member 101 and the mounting member 6 is compressed. That is to say, the first outer rim part 22 and the second outer rim part 26 are compressed. Thus, a gap between the tubular member 101 and the mounting member 6 is sealed. In addition, the first convex part 221 is fitted into the first concave part 262. Thus, the bellows 2 does not separate from the mounting member 6.

The band 7 does not necessarily have the structure described above. The band 7 is only required to clamp the tubular member 101 and is not limited to a particular structure. The band 7 may also be called a binding band or a hose band.

The tubular member 101 is not necessarily metal. The tubular member 101 may be made of synthetic resin or rubber, for example. When the tubular member 101 is synthetic resin or rubber, the tubular member 101 does not necessarily have the slit 102 illustrated in FIG. 3.

In the production process of the bellows 2, the bent part 211 illustrated in FIG. 10 is not necessarily reversed. That is to say, at a point in time when being taken out of the mold, the bellows 2 may have the shape illustrated in FIG. 9. In addition, the bellows 2 is not necessarily rubber and may be an elastomer or the like, for example.

As described in the foregoing, the dust cover 1 includes the bushing 5, the bellows 2, and the mounting member 6. The mounting member 6 has the main body 61 extending along the circumferential direction about the central axis Z of the second steering shaft 85 (the steering shaft) and the flange part 62. The bellows 2 has the first outer rim part 22 being in contact with the outer circumferential face 61*a* of the main body 61, the first convex part 221 protruding from the first outer rim part 22 outward in the radial direction, the second outer rim part 26 provided with the first concave part 262 fitted with the first convex part 221 on its inner circumferential side, and the falling prevention member 266 (the fixing member) fixing the second outer rim part 26 to the flange part 62.

As illustrated in FIG. 7, with the falling prevention member 266 (the fixing member) fixed to the flange part 62, the vertical wall part 261 is pulled toward the vehicle cabin side (the right side of FIG. 7) by the falling prevention member 266. Consequently, the radial face 262*b* of the first concave part 262 presses the radial face 221*a* of the first convex part 221 toward the vehicle cabin side. The radial face 221*c* of the first convex part 221 is pressed toward the engine room side (the left side of FIG. 7) by the flange part 62. Thus, the first convex part 221 is held between the radial face 262*b* of the first concave part 262 and the flange part 62 in the axial direction of the central axis Z of the second steering shaft 85, and thus a state in which the first flexible part 21 and the second flexible part 25 of the bellows 2 are fitted onto the mounting member 6 can be maintained. The first convex part 221 is held between the radial face 262*b* of the first concave part 262 and the flange part 62, whereby positioning of the first outer rim part 22 and the second outer rim part 26 in the axial direction can be performed more surely and easily. Furthermore, the first outer rim part 22, the second outer rim part 26, and the mounting member 6 are integral with each other, thus water is inhibited from entering among the first outer rim part 22, the second outer rim part 26, and the mounting member 6, and thus waterproofness also improves.

The falling prevention member 266 (the fixing member) is an elastic member. The second outer rim part 26 is elastically held on the flange part 62 by the falling prevention member 266. As described in FIG. 8, in the state after the falling prevention member 266 is mounted on the flange part 62, the falling prevention member 266 is elongated in the axial direction owing to elastic deformation. Consequently, the second outer rim part 26 is elastically held on the flange part 62 by the falling prevention member 266. Consequently, even when outer force in a direction in which the bellows 2 becomes detached from the mounting member 6 is applied while the dust cover 1 is transported to a work area in which the dust cover 1 is mounted on the dash panel 10, the state in which the bellows 2 is fixed to the mounting member 6 is maintained.

The flange part 62 is provided with the through hole 62c, and the falling prevention member 266 (the fixing member) extends in the axial direction and passes through the through hole 62c to be fixed to the flange part 62. As illustrated in FIG. 7, a worker grips the tip part 266d and causes the tip part 266d to pass through the through hole 62c, whereby the falling prevention member 266 can be fixed to the flange part 62. Thus, the falling prevention member 266 can be mounted on the flange part 62 by easy work.

Three (a plurality of) falling prevention members 266 are provided at regular intervals along the circumferential direction. Thus, the second outer rim part 26 is held on the flange part 62 uniformly along the circumferential direction.

First Modification

Figure 14:
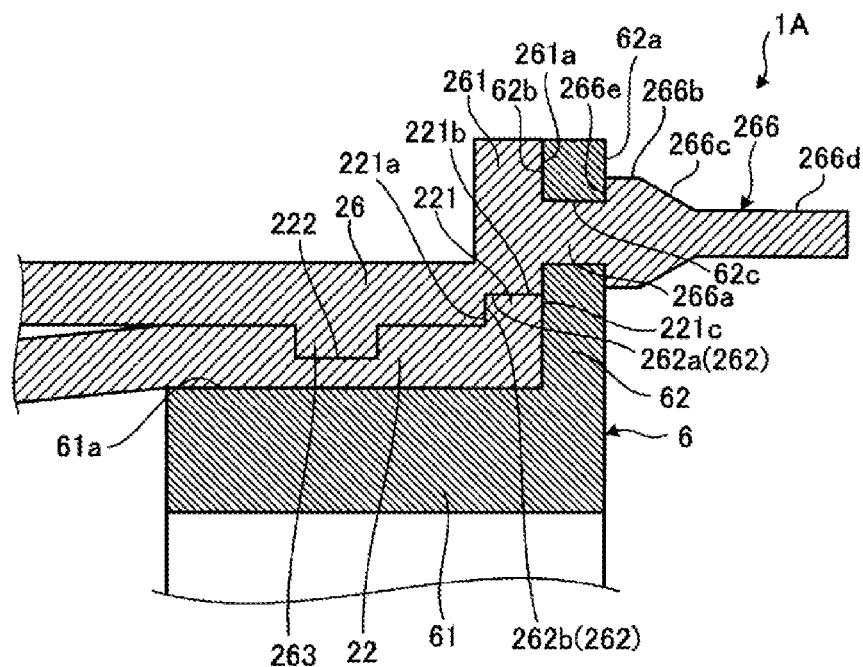
FIG. 14 is a sectional view of the area around the mounting member in a first modification.

The following describes a first modification of the first embodiment. FIG. 14 is a sectional view of the area around the mounting member in the first modification.

In a dust cover 1A, a second convex part 263 is provided on an inner circumferential face of the second outer rim part 26, whereas a second concave part 222 is provided on an outer circumferential face of the first outer rim part 22. The second convex part 263 and the second concave part 222 are provided annularly along the circumferential direction of the central axis Z. The second convex part 263 protrudes from the inner circumferential face of the second outer rim part 26 inward in the radial direction. The second concave part 222 is provided on the outer circumferential face of the first outer rim part 22 and is recessed inward in the radial direction. The second convex part 263 and the second concave part 222 have a rectangular shape in a section including the central axis Z. The second convex part 263 is fitted into the second concave part 222. The second convex part 263 and the second concave part 222 overlap with the band 7 illustrated in FIG. 3 in the radial direction. Thus, with the falling prevention member 266 (the fixing member) fixed to the flange part 62, a radial face of the second convex part 263 presses a radial face of the second concave part 222 toward the right side of FIG. 14 (the vehicle cabin side). In other words, the first convex part 221 is fixed in the axial direction by the first concave part 262, whereas the second convex part 263 is fixed in the axial direction by the second concave part 222. Consequently, the holding force of the first flexible part 21 and the second flexible part 25 to the mounting member 6 increases.

Second Modification

Figure 15:
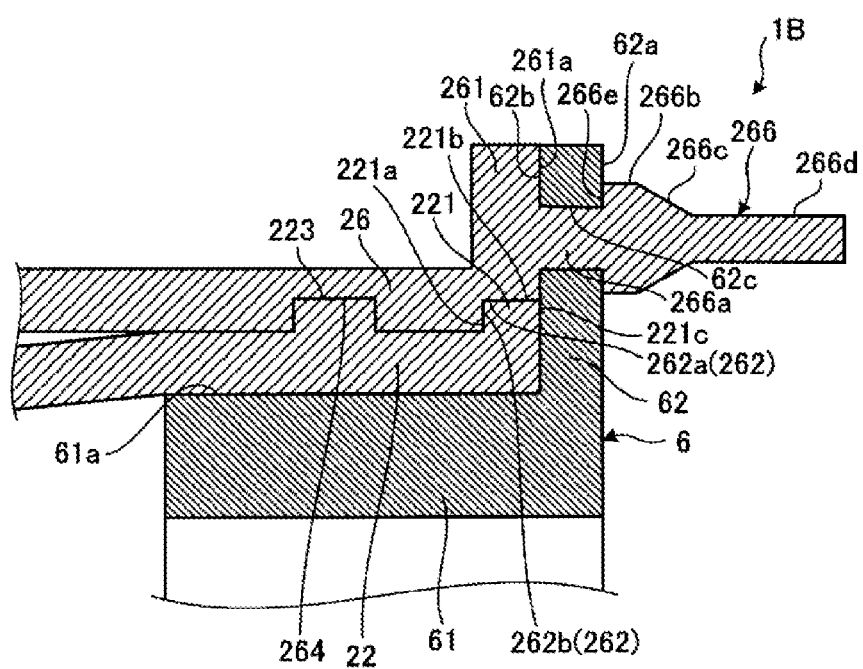
FIG. 15 is a sectional view of the area around the mounting member in a second modification.

The following describes a second modification of the first embodiment. FIG. 15 is a sectional view of the area around the mounting member in the second modification.

In a dust cover 1B, a second concave part 264 is provided on the inner circumferential face of the second outer rim part 26, whereas a second convex part 223 is provided on the outer circumferential face of the first outer rim part 22. The second convex part 223 and the second concave part 264 are provided annularly along the circumferential direction of the central axis Z. The second convex part 223 protrudes from the outer circumferential face of the first outer rim part 22 outward in the radial direction. The second concave part 264 is provided on the inner circumferential face of the second outer rim part 26 and is recessed outward in the radial direction. The second convex part 223 and the second concave part 264 have a rectangular shape in a section including the central axis Z. The second convex part 223 is fitted into the second concave part 264. The second convex part 223 and the second concave part 264 overlap with the band 7 illustrated in FIG. 3 in the radial direction. Thus, with the falling prevention member 266 (the fixing member) fixed to the flange part 62, a radial face of the second convex part 223 presses a radial face of the second concave part 264 toward the right side of FIG. 15 (the vehicle cabin side). In other words, the first convex part 221 is fixed in the axial direction by the first concave part 262, whereas the second convex part 223 is fixed in the axial direction by the second concave part 264. Consequently, the holding force of the first flexible part 21 and the second flexible part 25 to the mounting member 6 increases.

Third Modification

Figure 16:
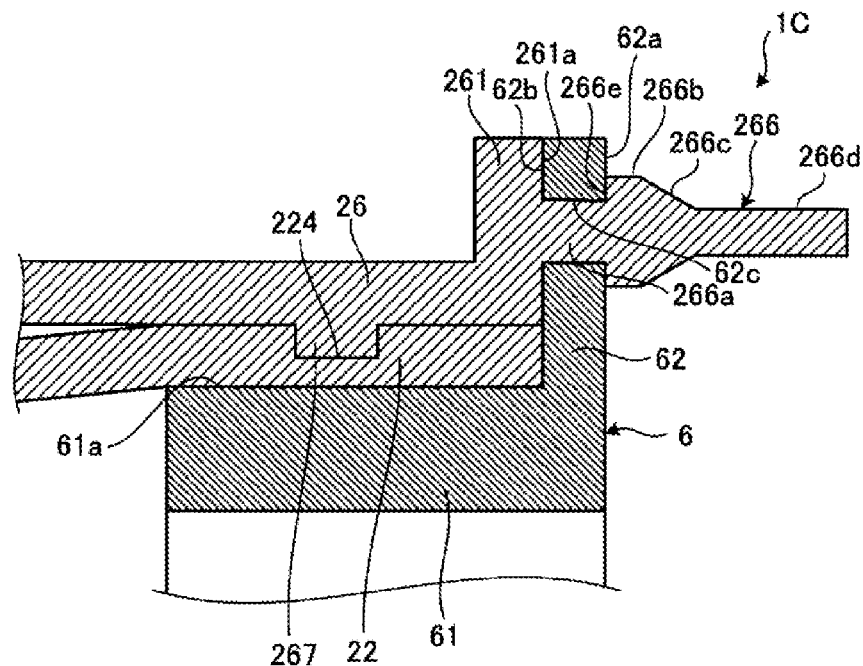
FIG. 16 is a sectional view of the area around the mounting member in a third modification.

The following describes a third modification of the first embodiment. FIG. 16 is a sectional view of the area around the mounting member in the third modification.

In a dust cover 1C, a first convex part 267 is provided on the inner circumferential face of the second outer rim part 26, whereas a first concave part 224 is provided on the outer circumferential face of the first outer rim part 22. The first convex part 267 and the first concave part 224 are provided annularly along the circumferential direction of the central axis Z. The first convex part 267 protrudes from the inner circumferential face of the second outer rim part 26 inward in the radial direction. The first concave part 224 is provided on the outer circumferential face of the first outer rim part 22 and is recessed inward in the radial direction. The first convex part 267 and the first concave part 224 have a rectangular shape in a section including the central axis Z. The first convex part 267 is fitted into the first concave part 224. The first convex part 267 and the first concave part 224 overlap with the band 7 illustrated in FIG. 3 in the radial direction. Thus, with the falling prevention member 266 (the fixing member) fixed to the flange part 62, a radial face of the first convex part 267 presses a radial face of the first concave part 224 toward the right side of FIG. 16 (the vehicle cabin side). In other words, the first convex part 267 is fixed in the axial direction by the first concave part 224.

Consequently, the holding force of the first flexible part 21 and the second flexible part 25 to the mounting member 6 increases.

Fourth Modification

Figure 17:
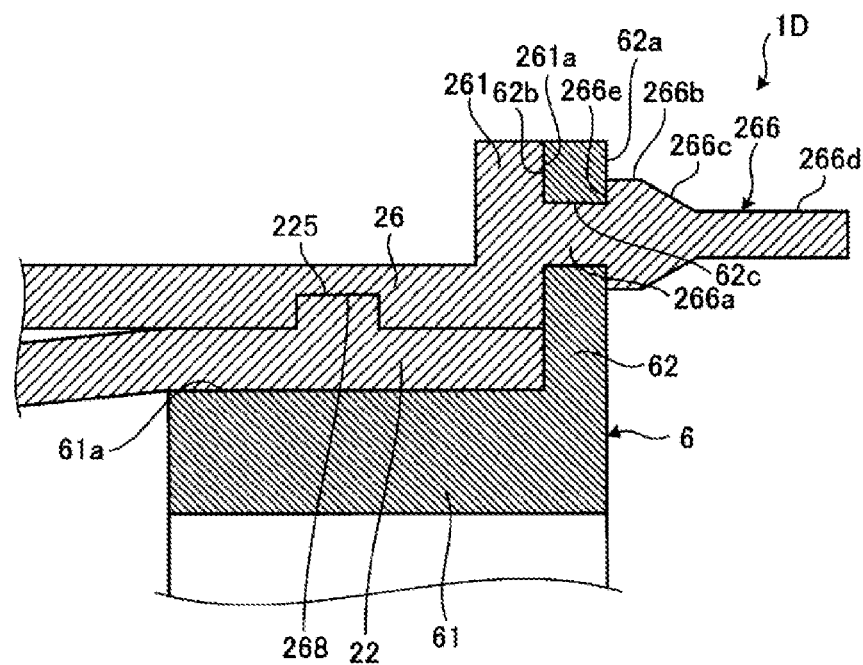
FIG. 17 is a sectional view of the area around the mounting member in a fourth modification.

The following describes a fourth modification of the first embodiment. FIG. 17 is a sectional view of the area around the mounting member in the fourth modification.

In a dust cover 1D, a first concave part 268 is provided on the inner circumferential face of the second outer rim part 26, whereas a first convex part 225 is provided on the outer circumferential face of the first outer rim part 22. The first convex part 225 and the first concave part 268 are provided annularly along the circumferential direction of the central axis Z. The first convex part 225 protrudes from the outer circumferential face of the first outer rim part 22 outward in the radial direction. The first concave part 268 is provided on the inner circumferential face of the second outer rim part 26 and is recessed outward in the radial direction. The first convex part 225 and the first concave part 268 have a rectangular shape in a section including the central axis Z. The first convex part 225 is fitted into the first concave part 268. The first convex part 225 and the first concave part 268 overlap with the band 7 illustrated in FIG. 3 in the radial direction. Thus, with the falling prevention member 266 (the fixing member) fixed to the flange part 62, a radial face of the first convex part 225 presses a radial face of the first concave part 268 toward the right side of FIG. 17 (the vehicle cabin side). In other words, the first convex part 225 is fixed in the axial direction by the first concave part 268. Consequently, the holding force of the first flexible part 21 and the second flexible part 25 to the mounting member 6 increases.

Fifth Modification

Figure 18:
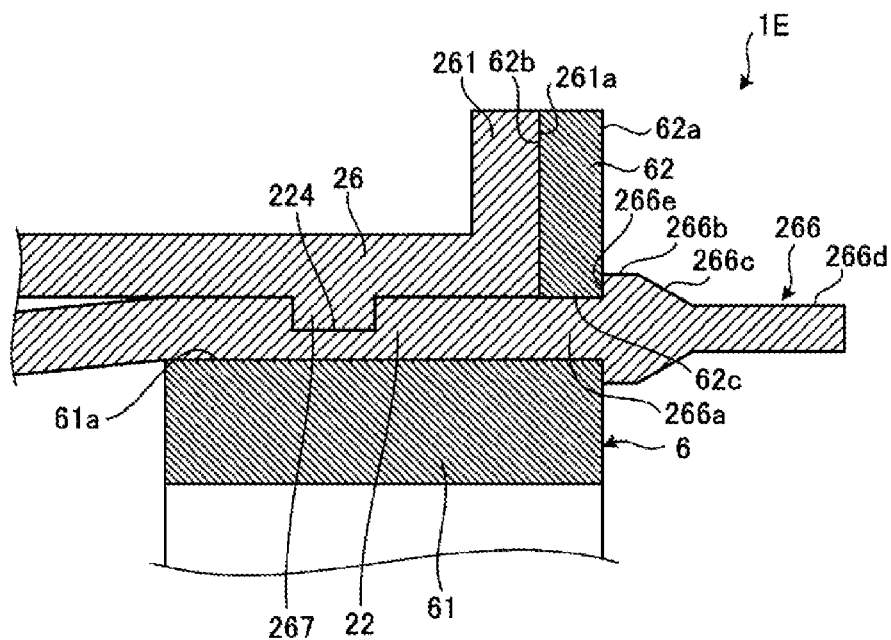
FIG. 18 is a sectional view of the area around the mounting member in a fifth modification.

The following describes a fifth modification of the first embodiment. FIG. 18 is a sectional view of the area around the mounting member in the fifth modification.

In a dust cover 1E, the falling prevention member 266 is provided integrally with the first outer rim part 22 by insert molding described below. The falling prevention member 266 is a fixing member fixing the first outer rim part 22 to the flange part 62. The second outer rim part 26 is mounted on the first outer rim part 22 and the flange part 62 while being stretched on the outer circumference of the first outer rim part 22. The falling prevention member 266 is rubber (an elastic member). The falling prevention member 266 has the small diameter part 266a, the large diameter part 266b, the tapered part 266c, and the tip part 266d.

The small diameter part 266a is disposed in the through hole 62c of the flange part 62. The outer circumferential face of the small diameter part 266a is in contact with the inner circumferential face of the through hole 62c. The large diameter part 266b and the tip part 266d have a cylindrical shape. The large diameter part 266b has a larger diameter than that of the tip part 266d. Consequently, the outer circumferential face of the tapered part 266c has a truncated cone shape having a gradually decreasing diameter toward the right side of FIG. 18 (the vehicle cabin side). The large diameter part 266b has a larger diameter than that of the small diameter part 266a. Consequently, the vertical wall face 266e of the large diameter part 266b is in contact with the vertical wall face 62a of the flange part 62.

The first convex part 267 is provided on the inner circumferential face of the second outer rim part 26, whereas the first concave part 224 is provided on the outer circumferential face of the first outer rim part 22. The first convex part 267 is fixed in the axial direction by the first concave part 224. Consequently, the holding force of the first flexible part 21 and the second flexible part 25 to the mounting member 6 increases.

The following simply describes a method for insert molding the falling prevention member 266. First, the mounting member 6 is placed inside a mold. Subsequently, a liquid rubber material is poured into the mold. Thus, the small diameter part 266a is disposed in the through hole 62c of the flange part 62. After being held for an appropriate cross-linking (vulcanization) time, a molded product is taken out. Thus, as illustrated in FIG. 18, the falling prevention member 266 is insert molded integrally on the first outer rim part 22, and the small diameter part 266a of the falling prevention member 266 is disposed in the through hole 62c of the flange part 62. Thus, in the fifth modification, the falling prevention member 266 and the first outer rim part 22 are an insert molded product molded integrally with the flange part 62.

Consequently, compared with a method in which the tip part 266d of the falling prevention member 266 is elongated and is caused to pass through the through hole 62c to fix the falling prevention member 266 to the flange part 62, insert molding can form the falling prevention member 266 having the large diameter part 266b having a larger outer diameter. In addition, when the tip part 266d of the falling prevention member 266 is elongated, and an excessive load is imposed on the falling prevention member 266, damage may occur in the falling prevention member 266. However, insert molding does not impose an excessive load on the falling prevention member 266, and thus damage is unlikely to occur in the falling prevention member 266.

Sixth Modification

Figure 19:
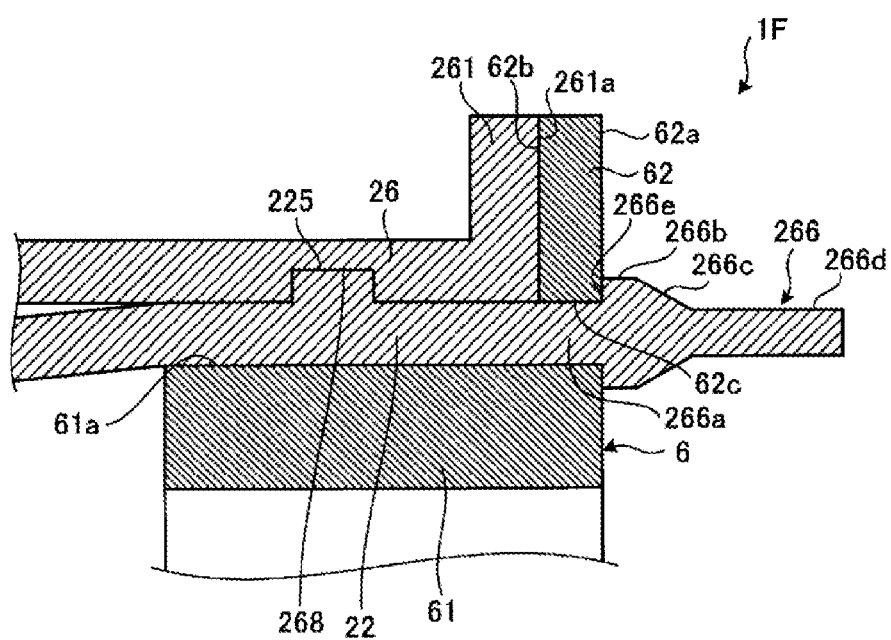
FIG. 19 is a sectional view of the area around the mounting member in a sixth modification.

The following describes a sixth modification of the first embodiment. FIG. 19 is a sectional view of the area around the mounting member in the sixth modification. The sixth modification is different from the fifth modification only in the first convex part and the first concave part.

In a dust cover 1F, the falling prevention member 266 is provided integrally with the first outer rim part 22 by insert molding. The falling prevention member 266 is a fixing member fixing the first outer rim part 22 to the flange part 62. The second outer rim part 26 is mounted on the first outer rim part 22 and the flange part 62 while being stretched on the outer circumference of the first outer rim part 22. The falling prevention member 266 is rubber (an elastic member). The structure of the falling prevention member 266 and the method for molding the same are the same as those of the fifth modification. In the sixth modification, the first concave part 268 is provided on the inner circumferential face of the second outer rim part 26, whereas the first convex part 225 is provided on the outer circumferential face of the first outer rim part 22. With the falling prevention member 266 (the fixing member) fixed to the flange part 62, the radial face of the first convex part 225 presses the radial face of the first concave part 268 toward the right side of FIG. 19 (the vehicle cabin side). In other words, the first convex part 225 is fixed in the axial direction by the first concave part 268. Consequently, the holding force of the first flexible part 21 and the second flexible part 25 to the mounting member 6 increases.

According to the sixth modification, in like manner with the fifth modification, the falling prevention member 266 having the large diameter part 266b having a larger outer diameter can be formed by insert molding. In addition, insert molding does not impose an excessive load on the falling prevention member 266, and thus damage is unlikely to occur in the falling prevention member 266.

Second Embodiment

Figure 20:
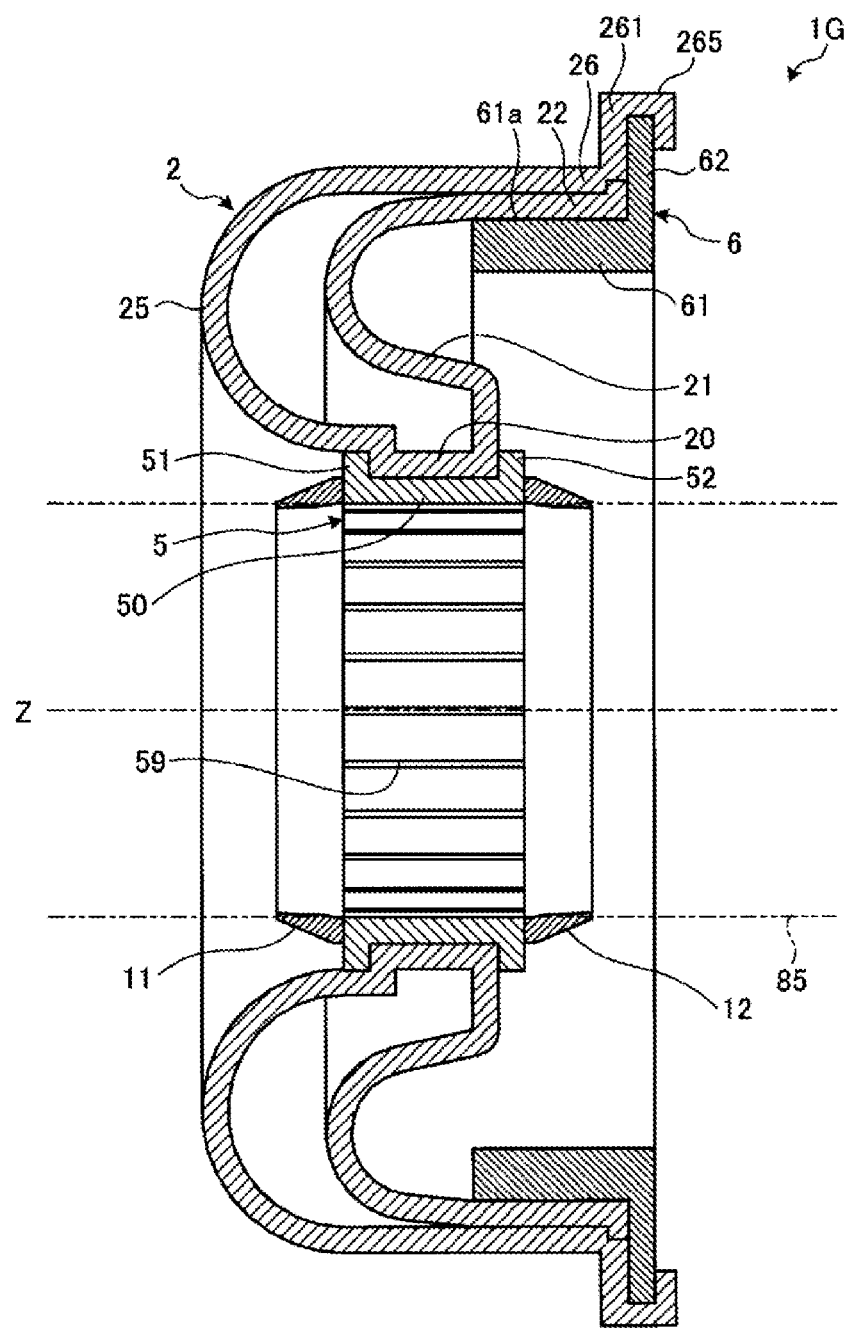
FIG. 20 is a sectional view of a dust cover of a second embodiment.
Figure 21:
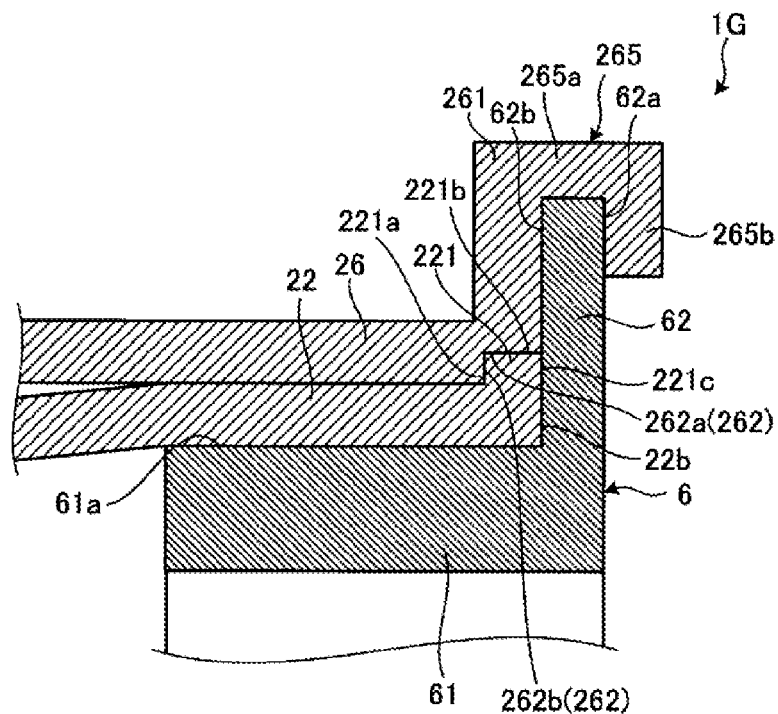
FIG. 21 is an enlarged view of the area around the mounting member in FIG. 20.
Figure 22:
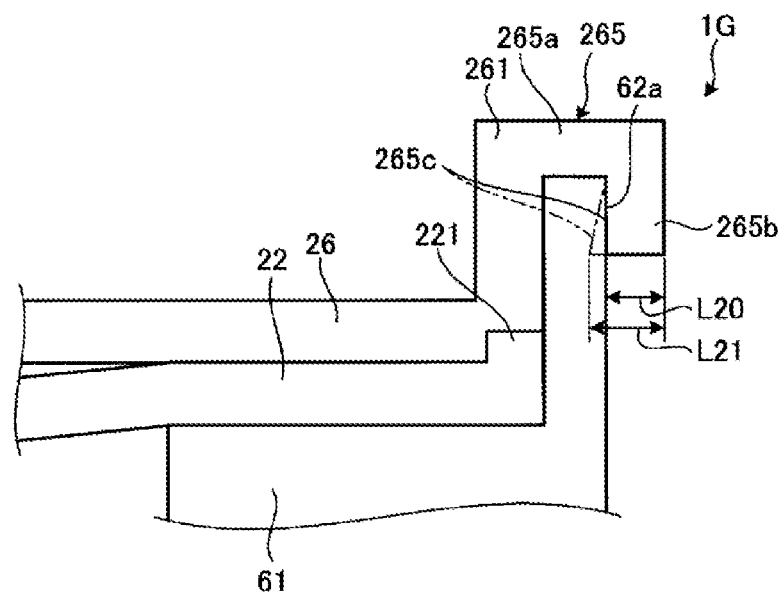
FIG. 22 is a schematic diagram illustrating the length of a gripping member.

The following describes a second embodiment. FIG. 20 is a sectional view of a dust cover of the second embodiment. FIG. 21 is an enlarged view of the area around the mounting member in FIG. 20. FIG. 22 is a schematic diagram illustrating the length of a gripping member.

In a dust cover 1G, a gripping member 265 is provided integrally with the second outer rim part 26. The gripping member 265 is a fixing member fixing the second outer rim part 26 to the flange part 62. The gripping member 265 is rubber (an elastic member) and elastically grips the flange part 62 from an outer circumferential side. The gripping member 265 has the vertical wall part 261, an outer circumferential part 265a, and a vertical wall part 265b. The gripping member 265 has a U shape in a section including the central axis Z. The outer circumferential part 265a is in contact with an outer circumferential face of the flange part 62 and covers the outer circumferential face. The outer circumferential part 265a extends toward the vehicle cabin side (the right side of FIG. 21) along the axial direction from an outer end of the vertical wall part 261 in the radial direction in a section including the central axis Z. The vertical wall part 265b extends inward in the radial direction (the lower side of FIG. 21) from an end of the outer circumferential part 265a in the axial direction. The gripping member 265 extends annularly along the circumferential direction of the central axis Z.

The following describes a mode of the elastic deformation of the gripping member 265 with reference to FIG. 22. In a state before the gripping member 265 is mounted on the flange part 62, as indicated by the chain double-dashed line in FIG. 22, a side face 265c of the vertical wall part 265b on the engine room side (the left side of FIG. 22) is inclined toward the engine room side (the left side of FIG. 22) as it is directed inward in the radial direction (the lower side of FIG. 22). In a state after the gripping member 265 is mounted on the flange part 62, as indicated by the solid line in FIG. 22, the side face 265c is in contact with the vertical wall face 62a of the flange part 62. Consequently, the second outer rim part 26 is elastically held on the flange part 62 by the gripping member 265. As illustrated in FIG. 21, the first convex part 221 is held between the first concave part 262 and the flange part 62 in the axial direction.

As described in the foregoing, the gripping member 265 (the fixing member) has a U shape in a section including the central axis Z and grips the flange part 62 from the outer circumferential side. Thus, gripping force with which the gripping member 265 grips the flange part 62 increases, and the state in which the bellows 2 is fitted onto the mounting member 6 can be maintained more surely.

First Modification

The following describes a first modification of the second embodiment (with illustration omitted). In the first modification, the gripping member 265 is provided integrally with the first outer rim part 22. The gripping member 265 is a fixing member fixing the first outer rim part 22 to the flange part 62. The gripping member 265 is rubber (an elastic member) and elastically grips the flange part 62 from the outer circumferential side. In like manner with FIG. 21, the gripping member 265 has the vertical wall part 261, the outer circumferential part 265a, and the vertical wall part 265b. The gripping member 265 has a U shape in a section including the central axis Z. The outer circumferential part 265a is in contact with the outer circumferential face of the flange part 62 and covers the outer circumferential face. The outer circumferential part 265a extends toward the vehicle cabin side along the axial direction from the outer end of the vertical wall part 261 in the radial direction in a section including the central axis Z. The vertical wall part 265b extends inward in the radial direction from the end of the outer circumferential part 265a in the axial direction. The gripping member 265 extends annularly along the circumferential direction of the central axis Z. A first convex part protrudes from an end of the second outer rim part 26 on the vehicle cabin side inward in the radial direction. A first concave part is provided on the outer circumferential face of the first outer rim part 22. The first convex part is fitted into the first concave part. According to the first modification as well, gripping force with which the gripping member 265 grips the flange part 62 increases, and the state in which the bellows 2 is fitted onto the mounting member 6 can be maintained more surely.

Figure 23:
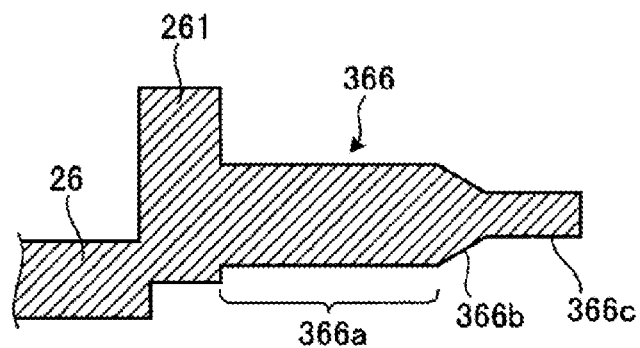
FIG. 23 is a sectional view of a modification of the falling prevention member.
Figure 24:
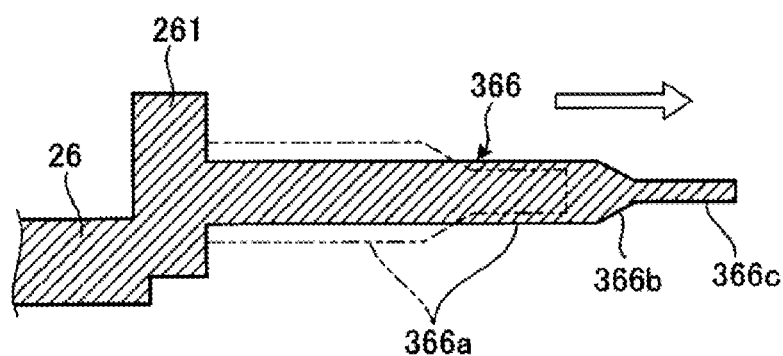
FIG. 24 is a sectional view illustrating a state in which the falling prevention member in FIG. 23 is elongated.
Figure 25:
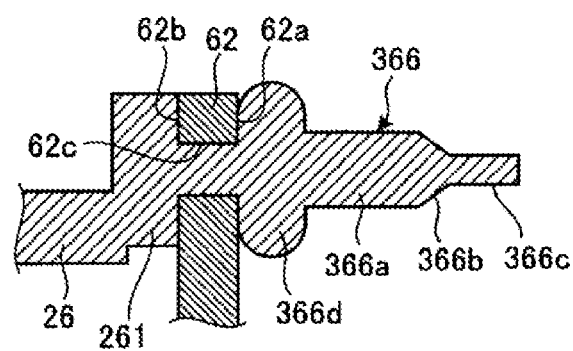
FIG. 25 is a sectional view illustrating a state in which the falling prevention member in FIG. 23 is mounted on the mounting member.

The embodiments have been described; the embodiments are not limited by the details described above. Although the first embodiment describes the falling prevention member 266, a falling prevention member 366 illustrated in FIG. 23 to FIG. 25 may be used, for example. FIG. 23 is a sectional view of a modification of the falling prevention member. FIG. 24 is a sectional view illustrating a state in which the falling prevention member in FIG. 23 is elongated. FIG. 25 is a sectional view illustrating a state in which the falling prevention member in FIG. 23 is mounted on the mounting member.

As illustrated in FIG. 23, the falling prevention member 366 is provided integrally with the vertical wall part 261. The falling prevention member 366 is rubber (an elastic member). The falling prevention member 366 has a large diameter part 366a, a tapered part 366b, and a tip part 366c. The large diameter part 366a is cylindrical and has the same outer diameter along its axis. The tip part 366c is also cylindrical and has the same outer diameter along its axis. The large diameter part 366a has a larger diameter than that of the tip part 366c. Consequently, an outer circumferential face of the tapered part 366b has a truncated cone shape having a gradually decreasing diameter toward the right side of FIG. 23 (the vehicle cabin side). The diameter of the large diameter part 366a is larger than the diameter of the through hole 62c of the flange part 62.

As illustrated in FIG. 24, when the tip part 366c is gripped and is pulled toward the right side indicated by the arrow (the axial direction, toward the vehicle cabin side), the large diameter part 366a becomes elastically deformed to have a smaller outer diameter. Note that the chain double-dashed line indicates a state before deformation, whereas the solid line indicates a state after deformation. The diameter of the large diameter part 366a becomes smaller than the diameter of the through hole 62c of the flange part 62. In this state after deformation, the tip part 366c is inserted into the through hole 62c of the flange part 62, and the tip part 366c is pulled toward the right side indicated by the arrow until the vertical wall part 261 comes into contact with the vertical wall face 62b of the flange part 62. Consequently, the large diameter part 366a having become deformed to have a smaller outer diameter is inserted into the through hole 62c of the flange part 62, and an outer circumferential face of the large diameter part 366a comes into contact with the inner circumferential face of the through hole 62c.

Subsequently, when the tip part 366c is released, as illustrated in FIG. 25, part of the large diameter part 366a swells outward in the radial direction to be a swelled part 366d, and the swelled part 366d comes into contact with the vertical wall face 62a of the flange part 62. The swelled part 366d and the vertical wall part 261 hold the flange part 62 therebetween, whereby the falling prevention member 366 is elastically fixed to the flange part 62.

REFERENCE SIGNS LIST 1, 1A, 1B, 1C, 1D, 1E, 1F, 1G DUST COVER
2 BELLOWS
5 BUSHING
6 MOUNTING MEMBER
10 DASH PANEL
20 BUSHING FITTING PART
21 FIRST FLEXIBLE PART
22 FIRST OUTER RIM PART
25 SECOND FLEXIBLE PART
26 SECOND OUTER RIM PART
61 MAIN BODY
61a OUTER CIRCUMFERENTIAL FACE
62 FLANGE PART
62c THROUGH HOLE
85 SECOND STEERING SHAFT (STEERING SHAFT)
101 TUBULAR MEMBER
221 FIRST CONVEX PART
222 SECOND CONCAVE PART
223 SECOND CONVEX PART
224 FIRST CONCAVE PART
225 FIRST CONVEX PART
262 FIRST CONCAVE PART
263 SECOND CONVEX PART
264 SECOND CONCAVE PART
265 GRIPPING MEMBER (FIXING MEMBER)
266 FALLING PREVENTION MEMBER (FIXING MEMBER)
267 FIRST CONVEX PART
268 FIRST CONCAVE PART
366 FALLING PREVENTION MEMBER (FIXING MEMBER)
Z CENTRAL AXIS

The invention claimed is:

1. A dust cover comprising:
a bushing mounted on an outer circumferential face of a steering shaft passing through a tubular member of a dash panel;
an annular bellows covering a gap between the tubular member and the bushing; and
a tubular mounting member pressing the bellows against the tubular member, the mounting member having:
a main body extending along a circumferential direction about a central axis of the steering shaft; and
a flange part protruding outward in a radial direction of the steering shaft, the bellows having:
a bushing fitting part being in contact with an outer circumferential face of the bushing;
a first outer rim part being in contact with an outer circumferential face of the main body;
a first flexible part coupling the bushing fitting part and the first outer rim part to each other;
a second outer rim part disposed on an outer circumferential side of the first outer rim part;
a fixing member fixing the first outer rim part or the second outer rim part to the flange part;
a second flexible part coupling the bushing fitting part and the second outer rim part to each other;
a first convex part provided on one of an outer circumferential face of the first outer rim part and an inner circumferential face of the second outer rim part and protruding in a radial direction from the one toward another; and
a first concave part provided on the other and fitted with the first convex part, and
with the first outer rim part or the second outer rim part fixed to the flange part via the fixing member, the first convex part being fixed in an axial direction of the central axis by the first concave part.

2. The dust cover according to claim 1, wherein
the fixing member is an elastic member, and
the first outer rim part or the second outer rim part is elastically held on the flange part by the fixing member.

3. The dust cover according to claim 1, wherein
the flange part is provided with a through hole, and
the fixing member is a falling prevention member passing through the through hole to be fixed to the flange part.

4. The dust cover according to claim 3, wherein the falling prevention member and the first outer rim part are an insert molded product molded integrally with the flange part.

5. The dust cover according to claim 3, or wherein a plurality of the falling prevention members are provided at regular intervals along the circumferential direction.

6. The dust cover according to claim 1, wherein the fixing member is a gripping member having a U shape in a section including the central axis and gripping the flange part from an outer circumferential side.

7. The dust cover according to claim 6, wherein the gripping member extends annularly along the circumferential direction.

8. The dust cover according to claim 1, wherein one of the outer circumferential face of the first outer rim part and the inner circumferential face of the second outer rim part is provided with a second convex part, and another is provided with a second concave part fitted with the second convex part.

* * * * *